US011065764B2

(12) United States Patent
Kakisaka et al.

(10) Patent No.: US 11,065,764 B2
(45) Date of Patent: Jul. 20, 2021

(54) METHOD OF GENERATING ROBOT OPERATION COMMAND AND ROBOT OPERATION COMMAND GENERATION DEVICE

(71) Applicant: Kabushiki Kaisha Yaskawa Denki, Kitakyushu (JP)

(72) Inventors: Yoichi Kakisaka, Kitakyushu (JP); Yukio Hashiguchi, Kitakyushu (JP); Hirokazu Kariyazaki, Kitakyushu (JP); Takashi Nagasaki, Kitakyushu (JP); Yukiko Sawada, Kitakyushu (JP); Keita Morisaki, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 236 days.

(21) Appl. No.: 15/936,452

(22) Filed: Mar. 27, 2018

(65) Prior Publication Data

US 2018/0281190 A1 Oct. 4, 2018

(30) Foreign Application Priority Data

Mar. 30, 2017 (JP) .............................. JP2017-066720

(51) Int. Cl.
*G06F 19/00* (2018.01)
*B25J 9/16* (2006.01)
*B25J 9/00* (2006.01)

(52) U.S. Cl.
CPC ........... *B25J 9/1661* (2013.01); *B25J 9/0096* (2013.01); *B25J 9/1679* (2013.01); *B25J 9/1682* (2013.01);

(Continued)

(58) Field of Classification Search
CPC ...... B25J 9/1661; B25J 9/1682; B25J 9/0096; B25J 9/1679; B25J 9/1656; B25J 9/16; G05B 2219/45092; G05B 2219/40113
See application file for complete search history.

(56) References Cited

U.S. PATENT DOCUMENTS

| 5,930,461 A | 7/1999 | Bernstein et al. |
| 2008/0125893 A1 | 5/2008 | Tilove et al. |

(Continued)

FOREIGN PATENT DOCUMENTS

| CN | 105630005 A | 6/2016 |
| EP | 2962814 A2 | 1/2016 |

(Continued)

OTHER PUBLICATIONS

Office Action dated Nov. 22, 2019, for corresponding U.S. Appl. No. 15/795,266.

(Continued)

*Primary Examiner* — Harry Y Oh
*Assistant Examiner* — Sohana Tanju Khayer
(74) *Attorney, Agent, or Firm* — HEA Law PLLC

(57) ABSTRACT

A method of generating a robot operation command includes extracting a work command from an overall work flow; extracting, from a command definition database, a command definition corresponding to the extracted work command, the work command having been read; generating, by referring to the read work command, a set of unit jobs in which at least one work command is arranged in order, based on the extracted command definition; generating, for a plurality of unit jobs, a connecting job for causing a robot to be moved from an end position of a previous unit job to a start position of a subsequent unit job; and generating a robot operation command in which the unit jobs and the connecting job are continuous.

16 Claims, 15 Drawing Sheets

(52) U.S. Cl.
CPC ............ *G05B 2219/40113* (2013.01); *G05B 2219/45092* (2013.01)

(56) References Cited

U.S. PATENT DOCUMENTS

| | | | |
|---|---|---|---|
| 2011/0046910 A1* | 2/2011 | Haas | G01N 35/00871 |
| | | | 702/108 |
| 2011/0060443 A1 | 3/2011 | Schwarm | |
| 2012/0215351 A1 | 8/2012 | McGee et al. | |
| 2014/0172167 A1 | 6/2014 | Matsukuma et al. | |
| 2016/0144507 A1 | 5/2016 | Natsume et al. | |
| 2016/0184987 A1* | 6/2016 | Masui | B25J 9/1664 |
| | | | 700/245 |
| 2016/0320774 A1 | 11/2016 | Kuhara | |
| 2017/0274528 A1* | 9/2017 | Inaba | B25J 9/163 |
| 2017/0329313 A1* | 11/2017 | Izumi | B25J 11/00 |
| 2018/0046963 A1* | 2/2018 | Kobayashi | G06Q 10/06315 |
| 2019/0184564 A1* | 6/2019 | Muraoka | G05B 19/41805 |
| 2019/0202058 A1* | 7/2019 | Dai | B25J 13/06 |

FOREIGN PATENT DOCUMENTS

| | | |
|---|---|---|
| EP | 3255136 A1 | 12/2017 |
| JP | 2009157528 A | 7/2009 |
| JP | 5582427 B2 | 9/2014 |
| JP | 2016159406 A | 9/2016 |
| WO | 2016170606 A1 | 10/2016 |
| WO | 2016/125259 A1 | 10/2017 |

OTHER PUBLICATIONS

Sunil V B et al: "WebROBOT: Internet based robotic assembly planning system", Computers in Indu, Elsevier, Amsterdam, NL, vol. 54, No. 2, Jun. 1, 2004 (Jun. 1, 2004), pp. 191-207, XP004503212, ISSN: 0166-3615, DOI: 10.1016/J. COMPIND. 2003.07.008.
Search Report dated Oct. 8, 2018, for corresponding EP Patent Application No. 18162603.7.
Office Action dated Jan. 8, 2021, for related U.S. Appl. No. 15/795,266 pp. 1-42.
Office Action dated Aug. 13, 2020, for relating CN Patent Application No. 201711017379.7 with English translation.
Office Action dated Sep. 21, 2020, for relating U.S. Appl. No. 15/795,266.
Office Action dated Nov. 4, 2020, for corresponding JP Patent Application No. 2017-066720 with partial English translation.
Office Action of May 26, 2021, for corresponding EP Patent Application No. 18162603.7.

* cited by examiner

| | HAND STATE |
|---|---|
| 0 | NOT HOLDING ANYTHING |
| 1 | HOLDING MICROTUBE |
| 2 | HOLDING PIPET (NO TIP) |
| 3 | HOLDING PIPET (WITH TIP) |

~61a

| | THERMOSTATIC BATH |
|---|---|
| 0 | DOOR CLOSED |
| 1 | DOOR OPEN |

~61b

| | PIPET RACK STATE |
|---|---|
| 0 | ALL PIPETS STORED |
| 1 | FIRST PIPET NOT STORED |
| 2 | SECOND PIPET NOT STORED |
| 3 | THIRD PIPET NOT STORED |

~61c

| | CENTRIFUGAL SEPARATOR STATE |
|---|---|
| 0 | LID OPEN (CENTRIFUGAL SEPARATOR STOPPED) |
| 1 | LID CLOSED (CENTRIFUGAL SEPARATOR STOPPED) |
| 2 | LID CLOSED (CENTRIFUGAL SEPARATOR RUNNING) |

UNIT JOB GROUP STORAGE UNIT                          1cb

| UNIT JOB | REQUIRED TIME |
|---|---|
| TRANSFER: TUBE RACK → MAIN RACK | 10s |
| HOLD PIPET | 10s |
| MOUNT TIP | 4s |
| SUCK SOLUTION A | 8s |
| SUCK SOLUTION B | 20s |
| DISCHARGE SOLUTION TO MICROTUBE | 10s |
| DISCARD TIP | 2s |
| RETURN PIPET | 10s |
| TRANSFER: MAIN RACK → CENTRIFUGAL SEPARATOR | 20s |
| TRANSFER: CENTRIFUGAL SEPARATOR → TUBE RACK | 20s |
| CENTRIFUGATION PROCESS | 20s+X |

CONNECTING JOB STORAGE UNIT

| CONNECTING JOB | REQUIRED TIME |
|---|---|
| MAIN RACK → PIPET RACK | 2s |
| PIPET RACK → TIP RACK | 4s |
| TIP RACK → THERMOSTATIC BATH | 2s |
| THERMOSTATIC BATH → MAIN RACK | 2s |
| MAIN RACK → DUSTBIN | 3s |
| DUSTBIN → PIPET RACK | 4s |
| PIPET RACK → MAIN RACK | 4s |

METHOD OF GENERATING ROBOT OPERATION COMMAND AND ROBOT OPERATION COMMAND GENERATION DEVICE

INCORPORATION BY REFERENCE

The present disclosure contains subject matter related to that disclosed in Japanese Priority Patent Application JP 2017-066720 filed in the Japan Patent Office on Mar. 30, 2017, the entire contents of which are hereby incorporated by reference.

BACKGROUND OF THE INVENTION

Field of the Invention

The present invention relates to a method of generating a robot operation command and a robot operation command generation device.

Description of the Related Art

Teaching a robot how to perform work relies on the skill of an instructor, and hence there is a need to simplify how the work is taught. As an example of simplifying the teaching, in Japanese Patent No. 5582427, there is disclosed a device for forming a series of operations by combining unit job data when causing a robot to perform work.

An operation command for controlling the robot may include a conditional branch, a loop, and the like, and a unit job may be called in accordance with a determination result of such a conditional branch, loop, and the like. In such a case, the robot is required to determine which operation is to be performed based on a previous operation, and as a result, the operation commands become more complex and a calculation load on the robot control device increases. However, when a user writes a robot operation command so as not to include conditional branches, loops, and the like, the degree of freedom for writing the robot operation command is greatly reduced. Thus, the user is forced to write the robot operation command through use of redundant descriptions, which is inefficient.

In view of this, it is an object of the present invention to provide a robot operation command generation device, a program, and a method of generating a robot operation command, which are capable of preventing an increase in complexity to enable operation commands to be generated more easily.

SUMMARY OF THE INVENTION

According to one embodiment of the present invention, there is provided a method of generating a robot operation command, the method including: extracting a work command from an overall work flow; extracting, from a command definition database, a command definition corresponding to the extracted work command, the work command having been read; generating, by referring to the read work command, a set of unit jobs in which at least one work command is arranged in order, based on the extracted command definition; generating, for a plurality of unit jobs, a connecting job for causing a robot to be moved from an end position of a previous unit job to a start position of a subsequent unit job; and generating a robot operation command in which the plurality of unit jobs and the connecting job are continuous.

Further, in the method of generating a robot operation command according to another embodiment of the present invention, the generating a robot operation command may include calling the plurality of unit jobs from a unit job group stored in advance.

Further, in the method of generating a robot operation command according to another embodiment of the present invention, the command definition may define at least one order and combination of unit jobs to be used for each work command, and the at least one order and combination of unit jobs to be used for each work command may be selected in accordance with a work condition of the each work command.

Further, in the method of generating a robot operation command according to another embodiment of the present invention, the command definition may include, in addition to information representing the unit jobs that have been arranged in order for execution, control information for changing the unit jobs to be executed, and the generating a set of unit jobs may include converting the work command into the unit jobs arranged in series.

Further, in the method of generating a robot operation command according to another embodiment of the present invention, the generating a connecting job may include referring to a work model to generate the connecting job for moving along a path in which interference between models is inhibited from occurring.

Further, in the method of generating a robot operation command according to another embodiment of the present invention, the command definition may include robot held-object information, and the generating a connecting job may include generating the connecting job based on the robot held-object information.

Further, the method of generating a robot operation command according to another embodiment of the present invention may further include calculating an overall work time, which is a time required to execute the overall work flow, by adding up a time, which is stored in advance and required to execute the unit jobs, and a time required to execute the connecting job.

Further, in the method of generating a robot operation command according to another embodiment of the present invention, the calculating an overall work time may include: calculating the time required to execute the connecting job by simulating operation of the generated connecting job; and calculating the overall work time, which is the time required to execute the overall work flow, by adding up the time, which is stored in advance and required to execute the unit jobs, and the calculated time required to execute the connecting job.

Further, the method of generating a robot operation command according to another embodiment of the present invention may further include storing the time required to execute the generated connecting job.

Further, the method of generating a robot operation command according to another embodiment of the present invention may further include generating state information representing at least states of a work device and the robot at a start time point and an end time point of the work command.

Further, the method of generating a robot operation command according to another embodiment of the present invention may further include generating state information representing states of a work device and the robot at a start time point and an end time point of the unit jobs.

Further, the method of generating a robot operation command according to another embodiment of the present invention may further include generating state information representing at least states of a work device and the robot at a start time point and an end time point of the work command, and the generating a connecting job may include generating, based on the state information, the connecting job for moving along a path in which interference between models is inhibited from occurring.

Further, the method of generating a robot operation command according to another embodiment of the present invention may further include: storing the generated connecting job; and using a stored already generated connecting job when, for consecutive work commands, when state information at an end time point of a previous work command and at a start time point of a next work command is the same as the state information for the stored already generated connecting job.

Further, the method of generating a robot operation command according to another embodiment of the present invention may further include skipping generation of the connecting job or discarding the generated connecting job when, for consecutive work commands, an end position of a previous work command and a start position of a next work command are the same.

Further, the method of generating a robot operation command according to another embodiment of the present invention may further include discarding, when, for consecutive unit jobs, a previous unit job and a subsequent unit job are the same and only a work position has been offset, a movement command to an end position included in the previous unit job and a movement command to a start position included in the subsequent unit job.

Further, in the method of generating a robot operation command according to another embodiment of the present invention, the unit jobs may each include a coordinate system specification command for specifying a local coordinate system and a movement command that is based on the local coordinate system.

According to one embodiment of the present invention, there is provided a robot operation command generation device including: a work command extraction unit configured to extract a work command from an overall work flow; a command definition extraction unit configured to extract, from a command definition database, a command definition corresponding to the extracted work command, the work command having been read; a unit job set generation unit configured to generate, by referring to the read work command, a set of unit jobs in which at least one work command is arranged in a defined order, based on the extracted command definition; a connecting job generation unit configured to generate, for a plurality of unit jobs, a connecting job for causing a robot to be moved from an end position of a previous unit job to a start position of a subsequent unit job; and a robot operation command generation unit configured to generate a robot operation command in which the unit jobs and the connecting job are continuous.

Further, the robot operation command generation device according to another embodiment of the present invention may further include a unit job group storage unit configured to store a plurality of unit jobs generated in advance, and the robot operation command generation unit may be configured to refer to the plurality of unit jobs stored in the unit job group storage unit when generating the robot operation command.

According to one embodiment of the present invention, there is provided a computer program for causing a computer to function as the above-mentioned robot operation command generation device.

BRIEF DESCRIPTION OF THE DRAWINGS

FIG. 9 is a diagram for illustrating a part of an example of a state correspondence table to be referred to by the operation command generation device according to the embodiment of the present invention.

FIG. 13 is a diagram for schematically illustrating a unit job group stored in a unit job group storage unit.

FIG. 14 is a diagram for schematically illustrating a connecting job stored in a connecting job storage unit.

DESCRIPTION OF THE EMBODIMENTS

Figure 1:
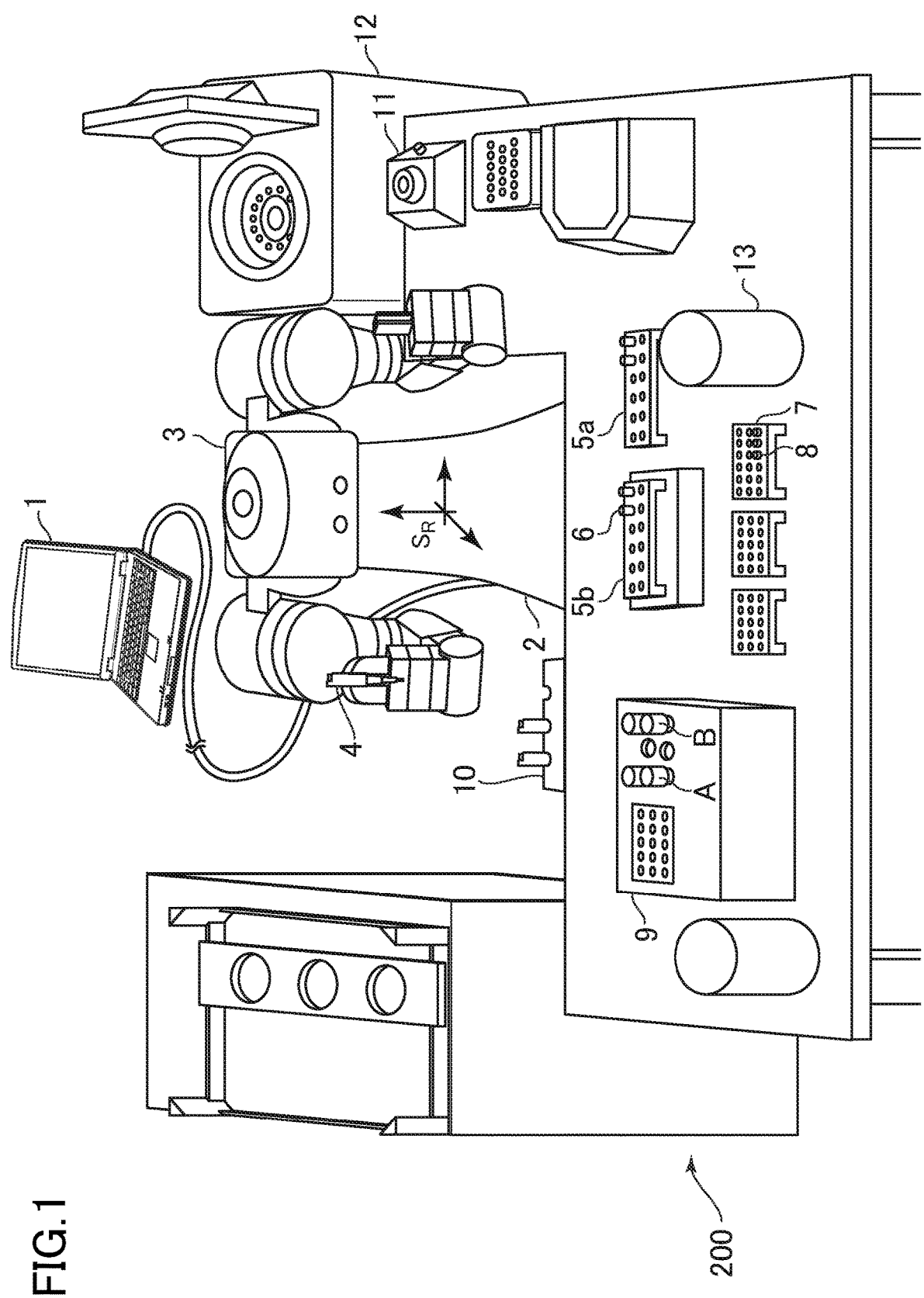
FIG. 1 is a schematic diagram for illustrating a physical configuration of a process system in an embodiment of the present invention.

FIG. 1 is a schematic diagram for illustrating a physical configuration of a process system 200 in an embodiment of the present invention. The process system 200 is, in the example illustrated in this embodiment, a system in which life science experiments and processes to be performed on a sample are automated by using a robot 3. The robot 3 to be used in the process system 200 is a general-purpose robot, in which the arms of the robot 3 are used to operate various machines commonly used in the life sciences in place of a human and to consecutively perform various complex operations. In each operation, a procedure as performed by an experienced operator depending on the sample is reproduced with a high level of precision.

The process system 200 is not a so-called dedicated device that executes only specific experiments and processes, but the process system 200 has the nature of a multipurpose device capable of flexibly handling various experiments and processes. Therefore, the process system 200 includes an operation command generation device 1. When a protocol chart is input to the operation command generation device 1, the operation command generation device 1 automatically generates a robot operation command, controls the robot 3, and causes the robot 3 to perform a desired operation. The protocol chart is a representation of a so-called protocol (i.e., description of the procedures and conditions of an experiment or a process) in the life sciences in the form of a chart that can be recognized by a human and that can standardize the form of the descriptions. The specific format of the protocol chart is described later, but the protocol chart represents each of the processes to be performed on a process subject or each of the processes to be performed on a container containing the process subject, and a plurality of process symbols having a determined processing order. Each of the plurality of process symbols visually represents an individual process included in the protocol, and the procedure of each of the processes is clearly shown by the arrangement of the process symbols.

In this embodiment, the process system 200 is described as a general-purpose cell for performing experiments and processes in the life sciences, but the field in which the process system 200 is to be applied is not limited to the life sciences. The process system 200 may be used in any application capable of using an automatic device that can flexibly handle various processes by using the robot 3. Therefore, when an overall work flow representing the overall work that is to be executed by the process system 200 is issued, the operation command generation device 1 generates a robot operation command from the overall work flow. The overall work flow includes work commands. In this case, the above-mentioned protocol chart corresponds to the overall work flow in the life science fields, each work command represents one item of work that the user desires the robot 3 to perform, and the process symbols included in the protocol chart correspond to the work commands.

Therefore, in the following description, the terms "protocol chart" and "process symbol" are used in view of the fact that the process system 200 is illustrated as a general-purpose cell for performing experiments and processes in the life sciences. However, when the technical field is not limited thereto, those terms can be read as "overall work flow" and "work command". Further, the specific description formats of the protocol chart and the process symbols described later are just one example of the protocol chart and the process symbols. Not only the description formats of the protocol chart and the process symbols, but also those of the overall work flow and the work commands are not limited to specific formats.

The operation command generation device 1 itself may be a dedicated device. However, in this case, the operation command generation device 1 is implemented by using a common computer. In other words, a commercially-available computer configured to execute a computer program for causing the computer to operate as the operation command generation device 1 is used for the operation command generation device 1. The computer program is in general provided in the form of application software, and is used when installed on the computer. The application software may be provided by recording the application software on a compact disc read-only memory (CD-ROM), a digital versatile disc (DVD) ROM, or another suitable computer-readable information recording medium. Further, the application software may be provided over various information communication networks, such as the Internet. In addition, the functions of the application software may be provided by a server at a remote location over an information communication network, that is, may be implemented by so-called cloud computing.

The process system 200 includes a robot control device 2 configured to control at least the robot 3 based on an operation command generated by the operation command generation device 1. The robot control device 2, in principle, defines and controls the operation of the robot 3 by using a robot coordinate system $S_R$ having an origin in the robot 3. The robot control device 2 according to this embodiment is provided integrally with the robot 3, but the robot control device 2 may be provided separately from the robot 3.

The robot 3 is a general-purpose articulated robot. The form of the robot 3 is not particularly limited, and may be any form suited to the application (i.e., technical field), such as a vertical articulated robot, a horizontal articulated robot, or a gantry robot. The number of robots that are simultaneously installed may also be freely set. In this embodiment, the robot 3 is a dual-arm vertical articulated robot, which is a compact type of robot capable of reproducing the work performed by an experienced operator with a high precision as a result of having two robot arms.

The robot 3 uses the two robot arms to perform a process on the process subject or on the container containing the process subject. The robot 3 can operate laboratory equipment (shown or not shown), for example, can hold and operate with the robot arms a pipet 4 contained in a pipet rack 10. The robot 3 can also move various types of containers (shown or not shown), for example, can hold with the robot arms a microtube 6 stored in a tube rack 5a, and move the microtube 6 from the tube rack 5a to a thermostatic bath 9, a vortex mixer 11, a centrifugal separator 12, and the like. In this embodiment, in the case of holding the pipet 4 with the robot arms and sucking or injecting a solution, the robot 3 performs the work by mounting a tip 8 prepared in a tip rack 7 to the distal end of the pipet 4. The tip 8 is, in principle, a disposable tip, and used tips 8 are discarded in a dustbin 13. A solution A and a solution B are placed in the thermostatic bath 9, and maintained at a constant temperature. An appropriate solution A and solution B may be prepared in the amount and type required for the process to be performed by the process system 200. In this example, the solution A and the solution B are a phosphate-buffered saline and a lysis buffer, for example.

In the example illustrated in FIG. 1, the process system 200 includes the thermostatic bath 9, the vortex mixer 11, and the centrifugal separator 12, which are examples of pieces of equipment to be used when the robot 3 performs the experiment. The process system 200 may also include other equipment in addition to or instead of those pieces of equipment. For example, the process system 200 may include a rack for storing Petri dishes, a magnet rack, and the like.

Figure 2:
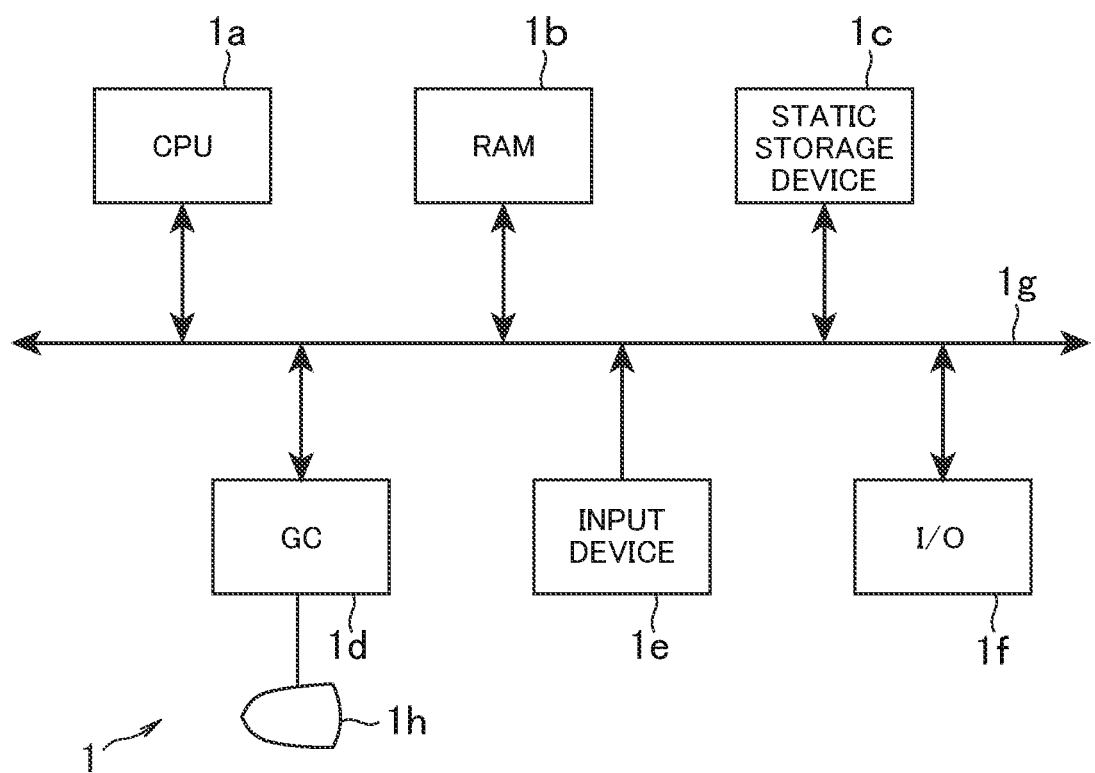
FIG. 2 is a block diagram for illustrating a physical configuration of an operation command generation device according to the embodiment of the present invention.

FIG. 2 is a block diagram for illustrating a physical configuration of the operation command generation device 1 according to the embodiment of the present invention. The configuration illustrated in FIG. 2 is a general computer used as the operation command generation device 1. In the computer, a central processing unit (CPU) 1a, a random access memory (RAM) 1b, a static storage device 1c, a graphics controller (GC) 1d, an input device 1e, and an input/output (I/O) 1f are connected to one another by a data bus 1g so that the devices can exchange electric signals therebetween. In this case, the static storage device 1c is a device capable of statically recording information, for example, a hard disk drive (HDD) or a solid state drive (SSD). Further, signals from the GC 1d are output and displayed as an image on a monitor 1h, for example, a flat panel display, which allows the user to visually recognize the image. The input device 1e is a device, for example, a keyboard, a mouse, or a touch panel, which allows the user to input information. The I/O 1f is an interface that allows the operation command generation device 1 to exchange information with an external device.

Figure 3:
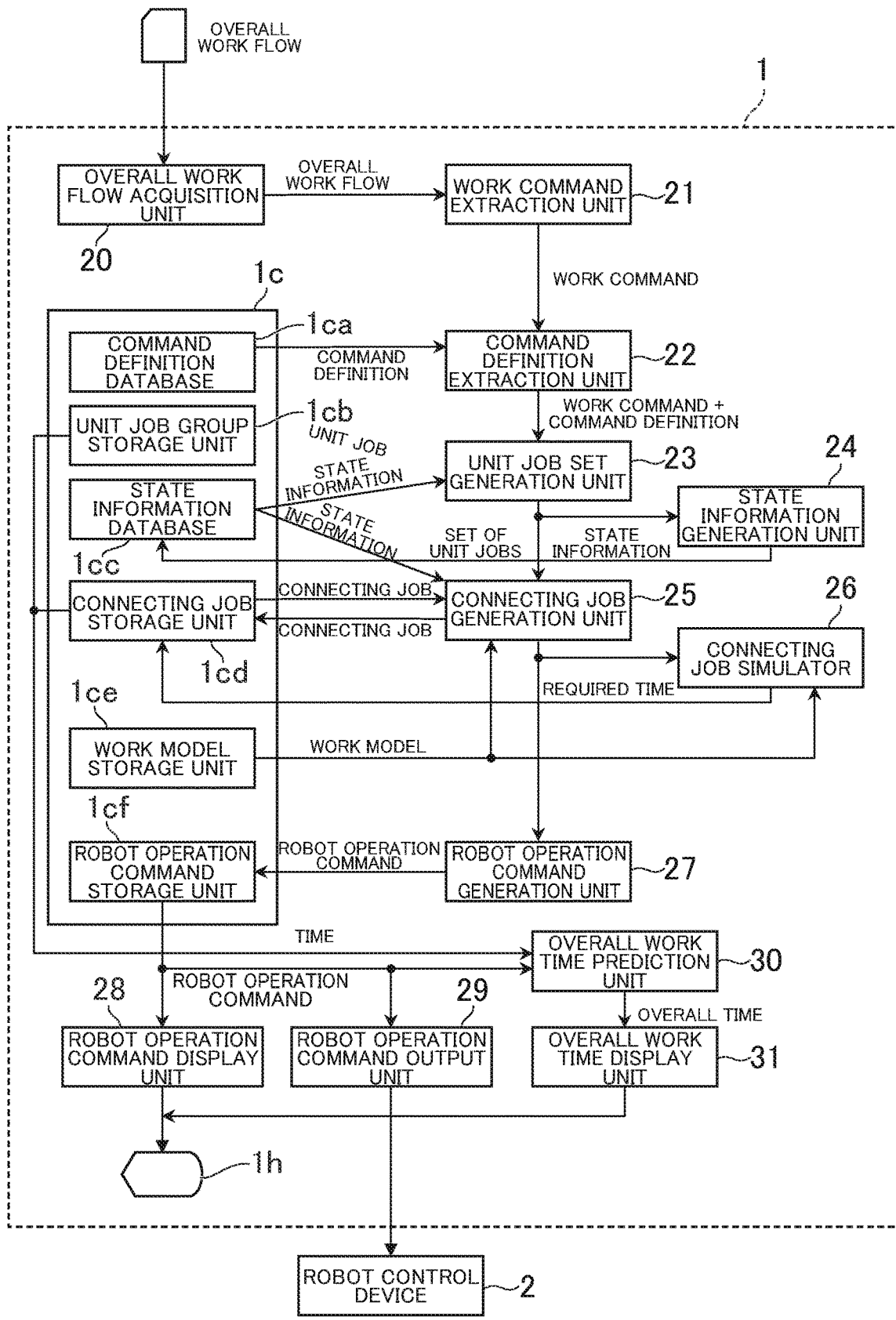
FIG. 3 is a function block diagram of the operation command generation device according to the embodiment of the present invention.

FIG. 3 is a function block diagram of the operation command generation device 1 according to the embodiment of the present invention. The function blocks illustrated in FIG. 3 focus on the functions of the operation command generation device 1, and the operation command generation device 1 does not necessarily have physical configurations corresponding to respective function blocks on a one-to-one basis. Some function blocks may be implemented by an information processing device, for example, the CPU 1a of the operation command generation device 1, executing specific software. Further, some function blocks may be implemented by a specific storage area being allocated to an information storage device, for example, the RAM 1b of the operation command generation device 1 or the static storage device 1c.

The operation command generation device 1 includes an overall work flow acquisition unit 20. The operation command generation device 1 generates a robot operation command based on a protocol chart acquired by the overall work flow acquisition unit 20. In this embodiment, the overall work flow is a protocol chart. The protocol chart may be acquired by reading an electronic file representing a protocol chart, or may be acquired based on input by the user using the input device 1e of the operation command generation device 1. In the latter case, the operation command generation device 1 simultaneously has a function for generating and editing the protocol chart, and may actually have the function. However, the function is not important in terms of describing the present invention, and hence a detailed description thereof is omitted in the present application.

The robot operation command is a group of commands written in the protocol chart to be issued to the robot 3 in order for the robot 3 to execute a series of items of work to be implemented as a whole by the process system 200. In other words, it can be said that the protocol chart is written such that a human can understand the protocol, whereas the robot operation command is written such that the robot 3 can execute the protocol. It can also be said that the operation command generation device 1 is a device configured to convert a protocol chart that can be seen and understood by a human into a robot operation command that can be executed by the robot 3.

The robot operation command includes unit jobs and connecting jobs. A unit job is a job representing one basic operation command of the robot 3, in which a start position and an end position are defined. In this case, one basic operation command does not necessarily correspond to a single command (i.e., mnemonic) to be recognized and executed by the robot control device 2, but represents a unit that can be considered as being one related group of operations of the robot 3. A plurality of mnemonics may be included in one operation command, and it is apparent that a plurality of unit operations of the robot may be included in one operation command. However, it is not appropriate for one related group of operations to be divided into those unit operations and freely combined. For example, a unit job of "holding a container" includes the plurality of unit operations of moving the robot arms to the position of the target container, operating the hands, and grabbing the container with the fingers. However, it is meaningless to divide those plurality of unit operations and perform a unit operation that only moves the robot arms to the position of the target container, or that moves the hands to a position where nothing is present and tries to grab something with the fingers, and hence such unit operations cannot be said to be one operation command, and do not correspond to a unit job.

The start position and the end position as used herein represent the position of each joint of the robot 3, that is, represent a vector amount of the rotation angle of each motor. The practical meaning of each of the start position and the end position is the posture of the robot 3. More specifically, the start position means the posture of the robot 3 exhibited when the operation starts, and the end position means the posture of the robot 3 exhibited when the operation ends.

A connecting job is an operation for handling a difference in the position (i.e., posture) of the robot 3 between unit jobs. More specifically, a connecting job is a collection of at least one movement command for moving (i.e., changing the posture of) the robot 3 from the end position of a previous unit job to the start position of a subsequent unit job. The robot operation command is configured such that when the unit jobs and connecting jobs are arranged in order and executed, the robot operation command can continuously operate in a seamless manner without the robot 3 generating or supplementing a new trajectory.

In the static storage device 1c of the operation command generation device 1, as storage areas, there are allocated a command definition database 1ca, a unit job group storage unit 1cb, a state information database 1cc, a connecting job storage unit 1cd, a work model storage unit 1ce, and a robot, operation command storage unit 1cf. The operation command generation device 1 generates the robot operation command, and has various functions for predicting the overall work time. Each function is represented in FIG. 3 as a function block. In FIG. 3, in addition to the overall work flow acquisition unit 20, there are illustrated a work command extraction unit 21, a command definition extraction unit 22, a unit job set generation unit 23, a state information generation unit 24, a connecting job generation unit 25, a connecting job simulator 26, a robot operation command generation unit 27, a robot operation command display unit 28, a robot operation command output unit 29, an overall work time prediction unit 30, and an overall work time display unit 31.

The details of the operation of each function block are described later together with the description of the overall operation of the operation command generation device 1, and hence an outline of the function of each function block is described here.

The overall work flow acquisition unit 20 acquires the overall work flow from outside. In this case, the overall work flow is a protocol chart. As described above, the protocol chart may be acquired as an electronic file representing a protocol chart, or may be acquired based on input from the user.

The work command extraction unit 21 receives the overall work flow from the overall work flow acquisition unit 20, and extracts the work commands included in the overall work flow in the order in which those work commands are to be executed. In this case, the process symbols included in the protocol chart are extracted in the execution order in accordance with an interpretation rule of the protocol chart.

The command definition extraction unit 22 receives the work commands from the work command extraction unit 21, and extracts the command definitions corresponding to those work commands from the command definition database 1ca.

A command definition defines at least one order and combination of the unit jobs to be used for each work command. In this example, the command definition defines which unit jobs are to be combined for each process symbol, and the order of those unit jobs.

The unit job set generation unit 23 receives the work commands and the command definitions from the command definition extraction unit 22, calls the unit jobs stored in the unit job group storage unit 1cb based on the order and combinations defined in the command definitions, and generates a set of unit jobs, which is a set of commands that can be executed by the robot control device 2. It is not always required for the set of unit jobs determined based on the command definition to correspond to the command definitions on a one-to-one basis. In other words, a set of different unit jobs may be generated even when the same command definition is used.

This is because the command definition includes, in addition to information representing the unit jobs that have been arranged in order for execution, control information, for example, a conditional branch, for changing the unit job to be executed. The unit job set generation unit 23 refers as appropriate to an argument, for example, a parameter of the command definition, and state information on the process system 200 that is recorded in the state information database 1cc, and based on the control information, generates a set of unit jobs by determining the unit jobs to be executed and the execution order thereof.

The state information generation unit 24 generates, based on the set of unit jobs generated by the unit job set generation unit 23, state information representing the state of the process system 200, namely, the states of the work devices and the robot 3. More specifically, the state information includes information required to know the state of the process system 200, such as whether or not the lid of the microtubes, which are work devices, is open, what is contained in the microtubes and the amount thereof, where each microtube is stored in the rack or whether a microtube is stored, or not stored, in a given position of the rack, what is the posture of the robot 3, and what equipment is held, or not held, in the robot hands.

In other words, how far the work has progressed at a time point can be grasped by referring to the state information at the time point in the overall work flow. Based on the overall work flow, this state information is generated sequentially from changes that are likely to occur in the process system 200 when a process is performed due to an operation by the robot 3. Therefore, the state information generation unit 24 generates state information representing at least the state of the work devices and the robot 3 at the start and end time points of the work command. As a result, the state of the process system 200 before and after a specific work command can be grasped, and appropriate measures can be taken even during a stoppage in the overall work flow, for example. In this embodiment, the state information generation unit 24 generates state information representing the state of the work devices and the robot 3 at the start and end time points of each unit job. As a result, the state of the process system 200 can be grasped in more detail, and even when an emergency stoppage has occurred due to an unforeseen situation during operation of the process system 200, it is easy to subsequently perform appropriate responses.

The generated state information is sequentially stored and accumulated in the state information database 1cc. The accumulated state information is, as described above, used when the unit job set generation unit 23 determines the unit jobs to be executed and the order thereof based on the control information, and is also referred to from outside as information from which the state of the process system 200 at any point in time can be known.

The connecting job generation unit 25 generates, between a plurality of consecutive unit jobs, a connecting job for moving the robot 3 from the end position of the previous unit job to the start position of the subsequent unit job. The connecting job is a collection of movement commands for moving the robot 3 from the end position of the previous unit job to the start position of the subsequent unit job. Execution of the connecting job between unit jobs enables a given unit job to be generated independently without considering a positional relation with another unit job, which improves productivity during unit job generation. Only the required amount of connecting jobs are automatically generated, and hence it is not required to generate connecting jobs for all the combinations of connections between a large number of unit jobs, which reduces the amount of processing time and effort and saves the capacity.

It is not always the case that the connecting jobs simply connect from the end position of the previous unit job to the start position of the subsequent unit job in the shortest path. Depending on the arrangement of the work devices and the posture of the robot 3, it may be required to change the posture of the robot 3 with a path in which there is no interference. Therefore, the connecting job generation unit 25 refers to a work model stored in the work model storage unit 1ce to generate a path in which no interference occurs between models, and generate a connecting job as a collection of movement commands for causing the robot 3 to move along the path. In this case, the work model is defined by the process system 200 as a three-dimensional model in a virtual space. In the work model, the robot 3 and the various work devices to be used are modeled and arranged. The work model is a three-dimensional model in a form corresponding to the state information (i.e., whether or not the lid is open or closed) obtained from the state information database 1cc. In a generation of a connecting job, the work model in a form corresponding to the state information at that time is referred to.

Examples of the work devices may include devices that are held and used in the hands of the robot 3, like an electric pipet. As the movement path of the robot 3, the kind of path that does not cause interference with another device depends on the work device held by the hands of the robot 3. Thus, in this embodiment, the command definition includes robot held-object information, which indicates the work device held by the robot 3 during execution of the corresponding work command. Therefore, when the connecting job generation unit 25 generates the connecting job, the connecting job generation unit 25 can generate a connecting job that does not cause interference among the work devices to occur, including the work device held by the robot 3, by referring to this robot held-object information.

The generated connecting job is stored in the connecting job storage unit 1cd. The connecting job generation unit 25 does not generate a duplicated connecting job that is exactly the same as a connecting job that has been generated. More specifically, when the state information at the start and the end time points of consecutive work commands or unit jobs is the same as the state information on a connecting job that has already been generated, the connecting job to be generated is the same as the already generated connecting job, and hence a connecting job is not newly generated. The load required in order to generate the connecting jobs is reduced by calling the connecting job stored in the connecting job storage unit 1cd.

The generated connecting job is used to simulate operation at the robot 3 and the work devices in the virtual space by the connecting job simulator 26. At this point, it is required to confirm that there is no interference between the robot 3 and the work devices, and the time required to execute the connecting job is obtained. When there is no interference and there are no problems in the connecting job, the time required to execute the connecting job is associated with the connecting job, and stored in the connecting job storage unit 1cd.

The connecting job and the set of unit jobs obtained in this way are connected in series in a predetermined order by the robot operation command generation unit 27, and a robot operation command is generated. The obtained robot operation command is stored in the robot operation command storage unit 1cf.

The robot operation command stored in the robot operation command storage unit 1cf is displayed in an appropriate format on the monitor 1h by the robot operation command display unit 28 in accordance with an appropriate instruction from the user, for example. Further, in accordance with an appropriate instruction from the user, for example, the robot operation command is output to the robot control device 2 by the robot operation command output unit 29, and the robot 3 operates in accordance with the robot operation command. As a result, in the process system 200, the work as written in the overall work flow is executed.

The execution time of the connecting job obtained as a result of a simulation by the connecting job simulator 26 is stored in association with the connecting job stored in the connecting job storage unit 1cd. Similarly, the execution time of each unit job is stored in association with each unit job stored in the unit job group storage unit 1cb. The execution time of the unit jobs may be calculated in advance by simulating in the same manner as for the connecting jobs, or may be calculated by causing the robot 3 to actually execute the unit job, and measuring the time taken to execute the unit job.

The overall work time prediction unit 30 calculates, for the robot operation command stored in the robot operation command storage unit 1cf, the overall work time, which is the time required to execute the overall work flow, by adding up the time required to execute the unit jobs included in the robot operation command and the time required to execute the connecting jobs included in the robot operation command. The overall work time is the predicted value of the required time when the work is executed by the process system 200 in accordance with the overall work flow.

The overall work time display unit 31 receives the overall work time from the overall work time prediction unit 30, and displays the received overall work time on the monitor 1h. As a result, without actually operating the robot 3 by using the process system 200, the time required to execute the overall work flow can be predicted in advance to a practical and sufficiently accurate level, which allows estimation of the number of items of work that can be processed within a certain time by the process system 200, setting of a process start time, and prediction of a process end time. Thus, it becomes easier to make an efficient execution plan.

Figure 4:
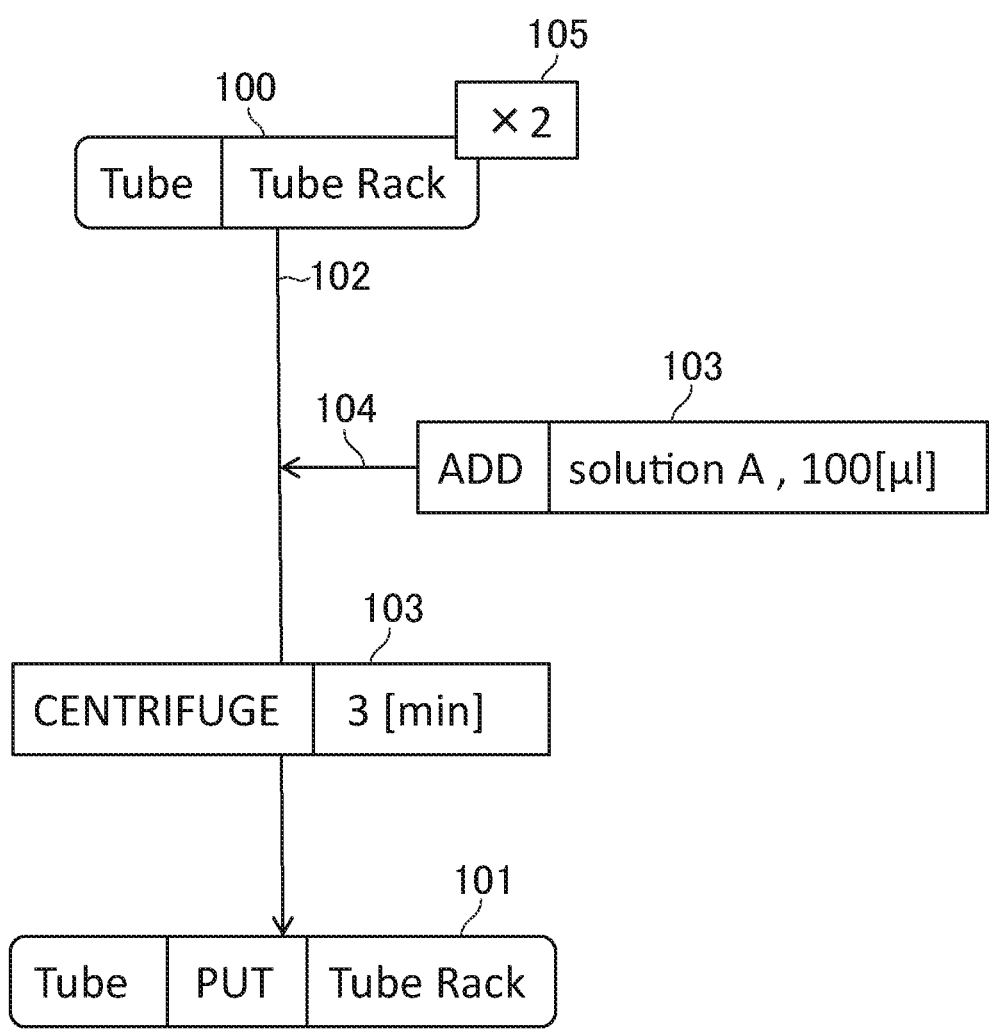
FIG. 4 is a diagram for illustrating an example of a protocol chart to be acquired by the operation command generation device according to the embodiment of the present invention.

FIG. 4 is a diagram for illustrating an example of the protocol chart to be acquired by the operation command generation device 1 according to the embodiment of the present invention. The protocol chart illustrated in FIG. 4 is a chart in which process symbols 103 representing process subjects or processes to be performed on the container containing a process subject are arranged such that the procedure can be understood. In this example, the process subject is a material to be processed in, for example, a life science experiment or test, and is often a portion of living tissue, such as a cell or DNA. The processes are performed on the process subject while contained in equipment suited to the experiment, for example, the microtube 6, a Petri dish, or a microplate. In the present application, those piece of equipment are simply referred to as a container.

In the protocol chart of this example, for each container containing the process subject, an initial symbol 100 representing an initial state of the container is arranged at the top of the chart and a final symbol 101 representing a final state of the container is arranged at the bottom of the chart, and the initial symbol 100 and the final symbol 101 are connected by an order line 102. The order line 102 represents the procedure of the processes progressing from the top to the bottom. The process symbols 103 arranged on the order line 102 represent the processes to be performed on the container in the order of the arrangement.

In the example illustrated in FIG. 4, there is illustrated a group including an initial symbol 100 in which "Tube" is written, a final symbol 101, and an order line 102 connecting the initial symbol 100 and the final symbol 101. In this example, the order line 102 is indicated by an arrow line, and clearly shows the order in which the processes are to be performed. The initial symbol 100 itself also indicates a process for preparing the container, and the final symbol 101 indicates a process for storing or discarding the container. This means that, in the protocol chart illustrated in this example, first, the process represented by the initial symbol 100, in which "Tube" is written, is performed, then the process represented by the process symbol 103, which is connected by an additional line 104 to the order line 102 and in which "ADD" is written, is performed, next the process represented by the process symbol 103, in which "CENTRIFUGE" is written, is performed, and lastly the process represented by the final symbol 101, in which "Tube" is written, is performed. The protocol chart of this example also includes a container count symbol 105 in which "×2" is displayed. The container count symbol 105 represents that two of the containers specified by the initial symbol 100 are prepared, and the subsequent processes are performed on each of those two containers.

The initial symbol 100 represents a process of transferring a "Tube", namely, the microtube 6, from the "Tube Rack", namely, the tube rack 5a, to the main rack 5b, which is a work area. In this example, the tube rack 5a is a microtube storage area or retreat area, and the main rack 5b is the area in which the process is to be specifically performed on the microtube 6 by using various types of equipment. The process symbol 103 in which "ADD" is written represents a process for adding "100 [µl]" of "solution A" to the microtube 6. The process symbol 103 in which "CENTRIFUGE" is written represents a process for setting the microtube in the centrifugal separator 12, and per forming centrifugation for "3 [min]". The final symbol 101 represents a process for transferring the microtube 6 to the tube rack 5a.

Figure 5:
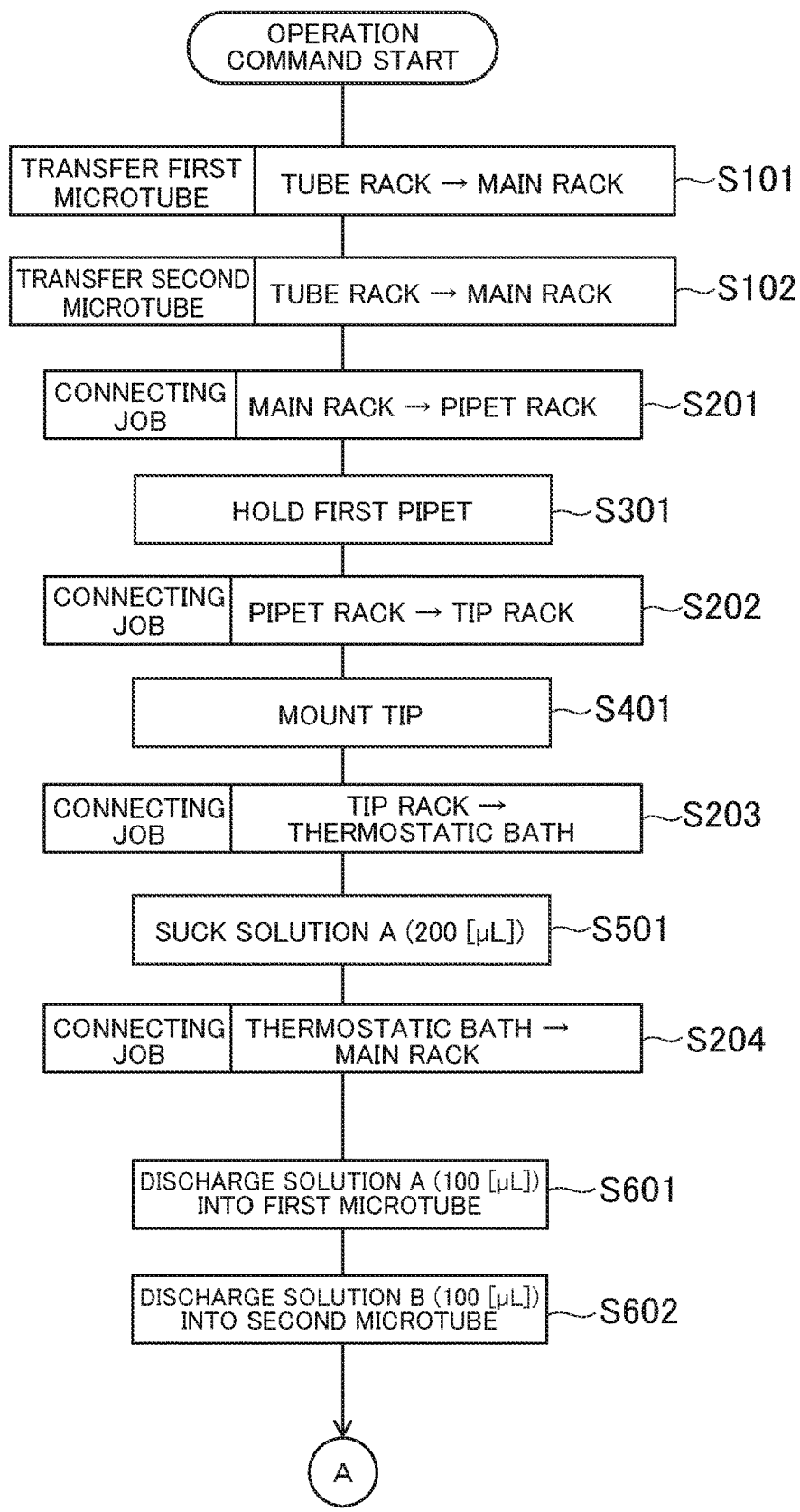
FIG. 5 is a flowchart for illustrating the first half of an example of a robot operation command to be generated by the operation command generation device according to the embodiment of the present invention.
Figure 6:
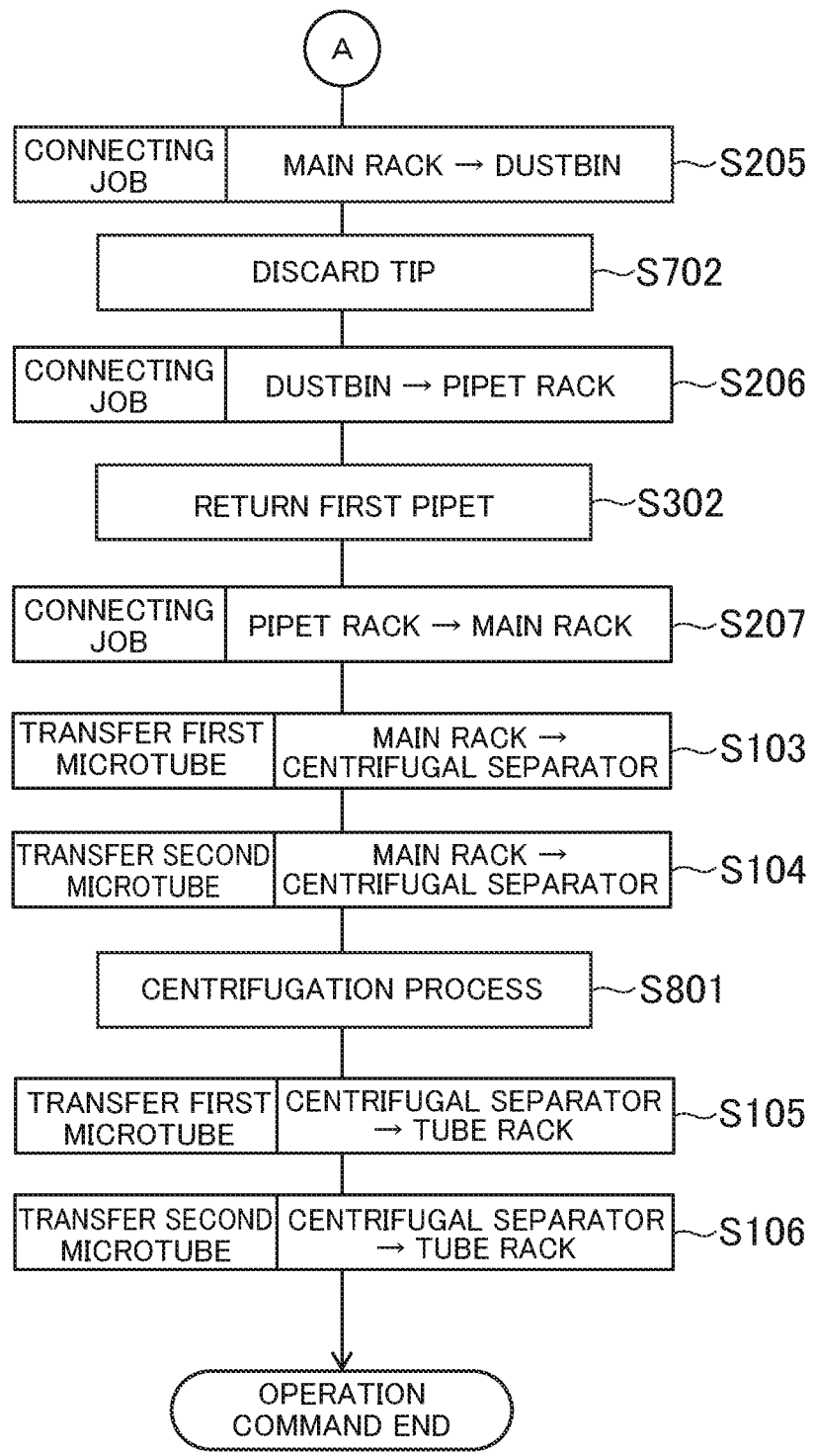
FIG. 6 is a flowchart for illustrating the second half of the example of the robot operation command to be generated by the operation command generation device according to the embodiment of the present invention.

FIG. 5 is a flowchart for illustrating the first half of an example of the robot operation command to be generated by the operation command generation device 1 according to the embodiment of the present invention. FIG. 6 is a flowchart for illustrating the second half of the example of the robot operation command to be generated by the operation command generation device 1 according to the embodiment of the present invention. The robot operation command described with reference to FIG. 5 and FIG. 6 is a robot operation command to be generated by the operation command generation device 1 according to this embodiment based on the protocol chart illustrated in FIG. 4.

The robot operation command starts from a set of unit jobs (Step S101) for transferring a first microtube 6 from the tube rack 5*a* to the main rack 5*b*, and then continues with a set of unit jobs (Step S102) for transferring the second microtube 6 from the tube rack 5*a* to the main rack 5*b*. Each set of unit jobs for transferring the microtube 6 to the main rack 5*b* is generated based on the initial symbol 100 of the protocol chart illustrated in FIG. 4. Based on the container count symbol 105 associated with the initial symbol 100, for the two microtubes 6, the unit job (Step S101) relating to a tube 1 and the unit job (Step S102) relating to a tube 2 are generated in the stated order. In this example, each of the unit job (Step S101) and the unit job (Step S102) is a set of unit jobs formed from a single unit job.

Figure 7:
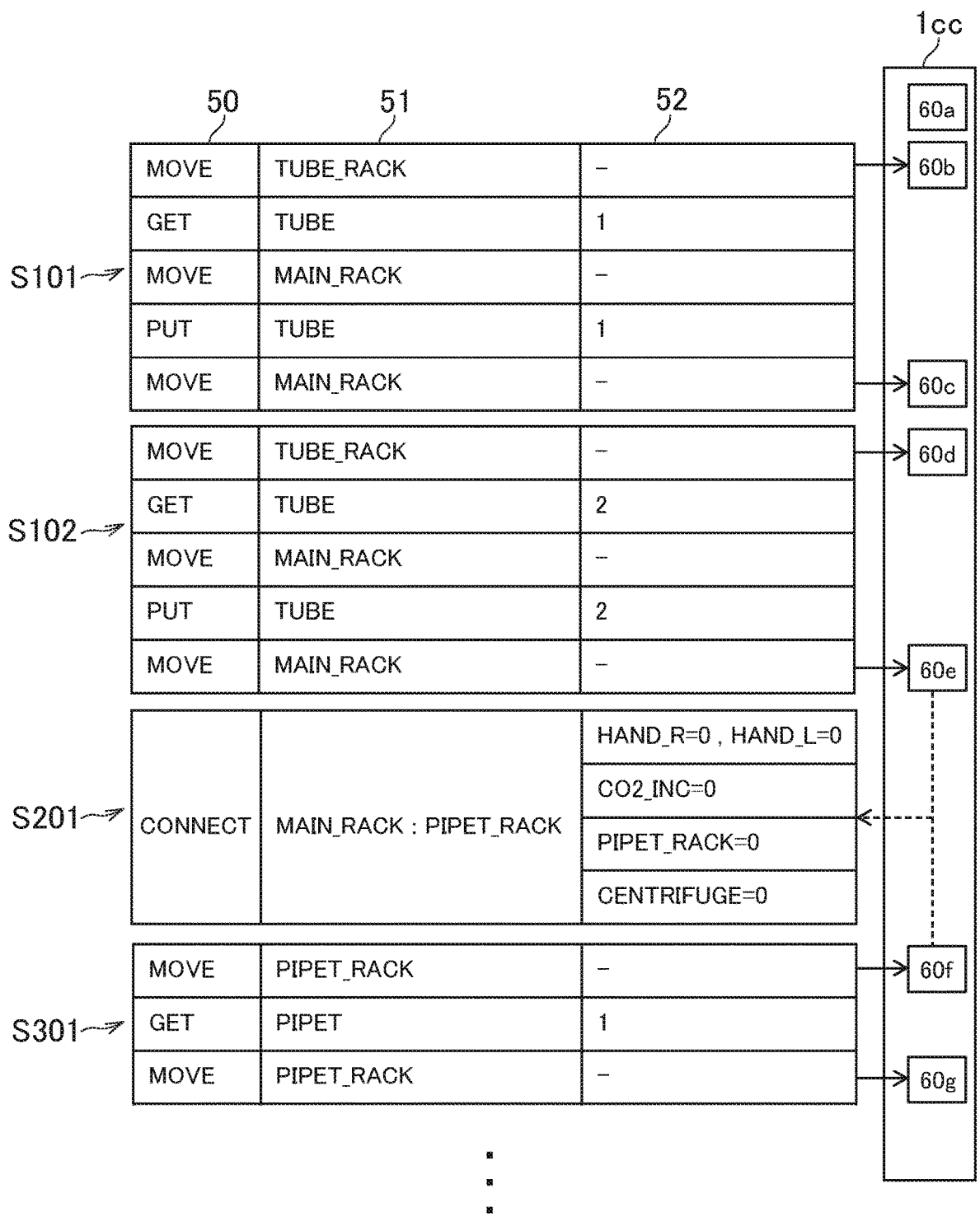
FIG. 7 is a diagram for illustrating details of the example of the robot operation command to be generated by the operation command generation device according to the embodiment of the present invention.

FIG. 7 is a diagram for illustrating the details of the example of the robot operation command to be generated by the operation command generation device 1 according to the embodiment of the present invention. In FIG. 7, a command 50 included in each unit job, and a target 51 and an argument 52 to be referred to by the command 50, are shown for the unit job (Step S101) for transferring the first microtube 6 to the main rack 5*b* and the unit job (Step S102) for transferring the second microtube 6 to the main rack 5*b*. Each unit job causes the robot 3 to perform at least one unit operation. The unit jobs include, in a head command, a movement command to a start position, which is a unit operation, and include, in a tail command, a movement command to an end position, which is a unit operation.

The unit job (Step S101) for transferring the first microtube 6 to the main rack 5*b* is a job for causing the robot 3 to perform a series of operations for transferring the microtube 6 to the main rack 5*b*, which is a work area. The unit job has, as a head command and a tail command, the movement command "MOVE". Specifically, for the head "MOVE" command 50, the target 51 is "TUBE_RACK" (i.e., tube rack 5*a*) and the argument 52 is "-" (i.e., none), and hence the robot arms are moved to the position of the tube rack 5*a*, which is the start position. For the "GET" command 50, the target 51 is "TUBE" (i.e., microtube 6) and the argument 52 is "1", and hence the first microtube 6 is held by the hand of the robot arm. For the next "MOVE" command 50, the target 51 is "MAIN_RACK" (i.e., main rack 5*b*), the argument 52 is "-" (i.e., none), and hence the robot arm holding the microtube 6 in the hand are moved to the position of the main rack 5*b*, which is the end position.

When the robot arms are said to be at the position of a specific work device, this means that the robot arms are close to the work device and are at a suitable reference position for performing various operations on the work device by using the robot arms. For example, a position for the tube rack 5*a* is, for example, a position that is above the tube rack 5*a* and that is separated from the tube rack 5*a* and the microtubes 6 placed in the tube rack 5*a* by a distance at which the hands or the object held in the hands do/does not interfere with the tube rack 5*a* or the microtubes 6 placed in the tube rack 5*a*. A suitable reference position is similarly determined for the other work devices as well.

For the "PUT" command 50, the target 51 is "TUBE" (i.e., microtube 6) and the argument 52 is "1", and hence the first microtube 6 held in the hands of the robot arms is placed in the main rack 5*b*. The first microtube 6 is placed in a first hole of the main rack 5*b* in accordance with the argument 52. Lastly, for the tail "MOVE" command 50, the target 51 is "MAIN_RACK" (i.e., main rack 5*b*) and the argument 52 is "-" (i.e., none), and hence the robot arms are moved to the position of the main rack 5*b*.

The unit job (Step S102) for transferring the second microtube 6 to the main rack 5*b* is a unit job for causing the robot 3 to perform a series of operations for transferring the microtube 6, which is different from the one described above, to the main rack 5*b*, which is a work area. The details of this operation are different from the unit job (Step S101) for transferring the first microtube 6 to the main rack 5*b* in the point that the arguments 52 for the "GET" command 50 and the "PUT" command 50 are "2". This difference means that the second microtube 6 is to be held by the hands and placed in the main rack 5*b*. In accordance with the argument 52, the hole of the main rack 5*b* in which the microtube 6 is to be placed is the second hole, which is also different from the above-mentioned case. As a result, the second microtube does not interfere with the first microtube. The operations for the "MOVE" commands 50 are the same as for the unit job (Step S101) for transferring the first microtube 6 to the main rack 5*b*.

In the operation command generated based on the example of the protocol chart illustrated in FIG. 4, a container count symbol 105 accompanies the initial symbol 100, and hence the argument to be passed to the repeatedly-executed unit jobs is different even for the same initial symbol 100, final symbol 101, and process symbol. Therefore, when the unit job set generation unit 23 generates a set of unit jobs, the argument to be passed to each symbol is generated and used as a real value.

More specifically, an argument that changes during execution of the work flow is issued in advance as a real value for the unit jobs included in the robot operation command and an argument is not generated as variables that change during execution of the work flow are referred to. As a result, when the state information is generated by the state information generation unit 24, which is described below, the state of the process system 200 can be uniquely determined.

With the operation command generation device 1 according to this embodiment, the use of a variable in the argument for the unit jobs included in the robot operation command to be generated is not necessarily excluded. A parameter that does not dynamically change during execution of the work flow may be obtained by referring to a variable. An example of such a parameter is the position of a reference point.

The tail command of the unit job (Step S101) for transferring the first microtube 6 to the main rack 5*b* is the "MOVE" command 50 for moving the robot arms to the position of the main rack 5*b*, which is the end position of the set of unit jobs. The head command of the unit job (Step S102) for transferring the second microtube 6 to the main rack 5*b* is the "MOVE" command 50 for moving the robot arms to the position of the tube rack 5*a*, which is the start position of the unit job. Therefore, after the previous unit job (Step S101) ends, when the subsequent unit job (Step S102) starts, the robot arms move from the position of the main rack 5*b* to the position of the tube rack 5*a*.

In this way, the head command of the unit jobs includes a movement command to a start position and the tail command of the unit jobs includes a movement command to an end position, and the robot 3 can be caused to perform a desired operation by executing serially-connected unit jobs in order.

With the operation command generation device 1 according to this embodiment, the robot operation command is generated as a robot operation command in which unit jobs are serially arranged in order, and hence a conditional branch determination, a loop determination, and the like are not performed by the robot control device 2. Therefore, even for a complicated process, the load on the robot control device 2 is small, and the process can be performed rapidly. Further, malfunctions caused by a program error, such as an endless loop, can be eliminated in advance. With the robot operation command generated by the operation command generation device 1 according to this embodiment, the content of the subsequent unit job does not vary depending on the content of the previous unit job, and hence the time required to execute that unit job can be easily estimated. This point is described in more detail later.

In FIG. 7, there is illustrated a case in which the state information is generated by the state information generation unit 24 and recorded in the state information database 1cc. The state information generation unit 24 generates state information representing at least the state of the work devices and the robot 3 at the start and end time points of the work command. However, in this embodiment, the state information generation unit 24 also generates state information representing the state of the work devices and the robot 3 at the start and end time points of unit jobs, and stores the generated state information in the state information database 1cc.

In this case, the state at the start time point of the unit job (Step S101) for transferring the first microtube 6 to the main rack 5b is a state in which the first microtube 6 has been moved to the position of the tube rack 5a, which is the start position, based on the initial "MOVE" command 50. This state of the robot 3 is recorded in the state information database 1cc as state information 60b in which the state of the other work devices is also written.

In addition, the state at the end time point of the unit job (Step S101) for transferring the first microtube 6 to the main rack 5b is a state in which the first microtube 6 has been moved to the position of the main rack 5b, which is the end position, based on the last "MOVE" command 50. This state of the robot 3 is recorded in the state information database 1cc as state information 60c in which the state of the other work devices is also written.

In the state information database 1cc, the initial state of the process system 200 is given as state information 60a. When generating new state information, the state information generation unit 24 may refer to a previous piece of state information, and generate the new state information by updating the portion of the state information that has changed. For example, when generating the state information 60b, the state of the work devices has not changed and only the position of the robot 3 has changed from the state information 60a, and hence it is sufficient to update the position of the robot 3 in the state information 60a to the position of the tube rack 5a. A difference with respect to the previous piece of state information can be recorded in the state information database 1cc as the second and subsequent pieces of state information.

Regarding the work devices to be recorded in the state information, all of the devices that are required in order to grasp the state of the process system 200 may be recorded. Examples of the work devices include, in addition to devices operated by the robot 3 by using the band of the robot arm, devices controlled by the robot control device 2 based on wired communication or wireless Communication. For example, when the pipet 4 is a manual pipet, the pipet 4 is a device operated by using the hand of the robot arm. In the case of an electric pipet capable of wireless communication, the pipet 4 may be a device controlled based on communication to/from the robot control device 2, and such a device is also considered to be a device operated by the robot 3. In the example illustrated in FIG. 1, the work devices are the pipet 4, the tube rack 5a, the main rack 5b, the microtubes 6, the tip rack 7, the tip 8, the thermostatic bath 9, the pipet rack 10, the vortex mixer 11, and the centrifugal separator 12.

The state information generation unit 24 in this embodiment generates state information at the start and end time points of the unit jobs, but the state information generation unit 24 can generate state information for each of other unit operations included in the unit jobs. The state information can also be generated for each unit operation, or for each mnemonic to be executed by the robot control device 2. Generation of more detailed state information allows the state of the process system 200 to be grasped in more detail, but generation of such state information also increases the required capacity of the state information database 1cc.

Figure 8:
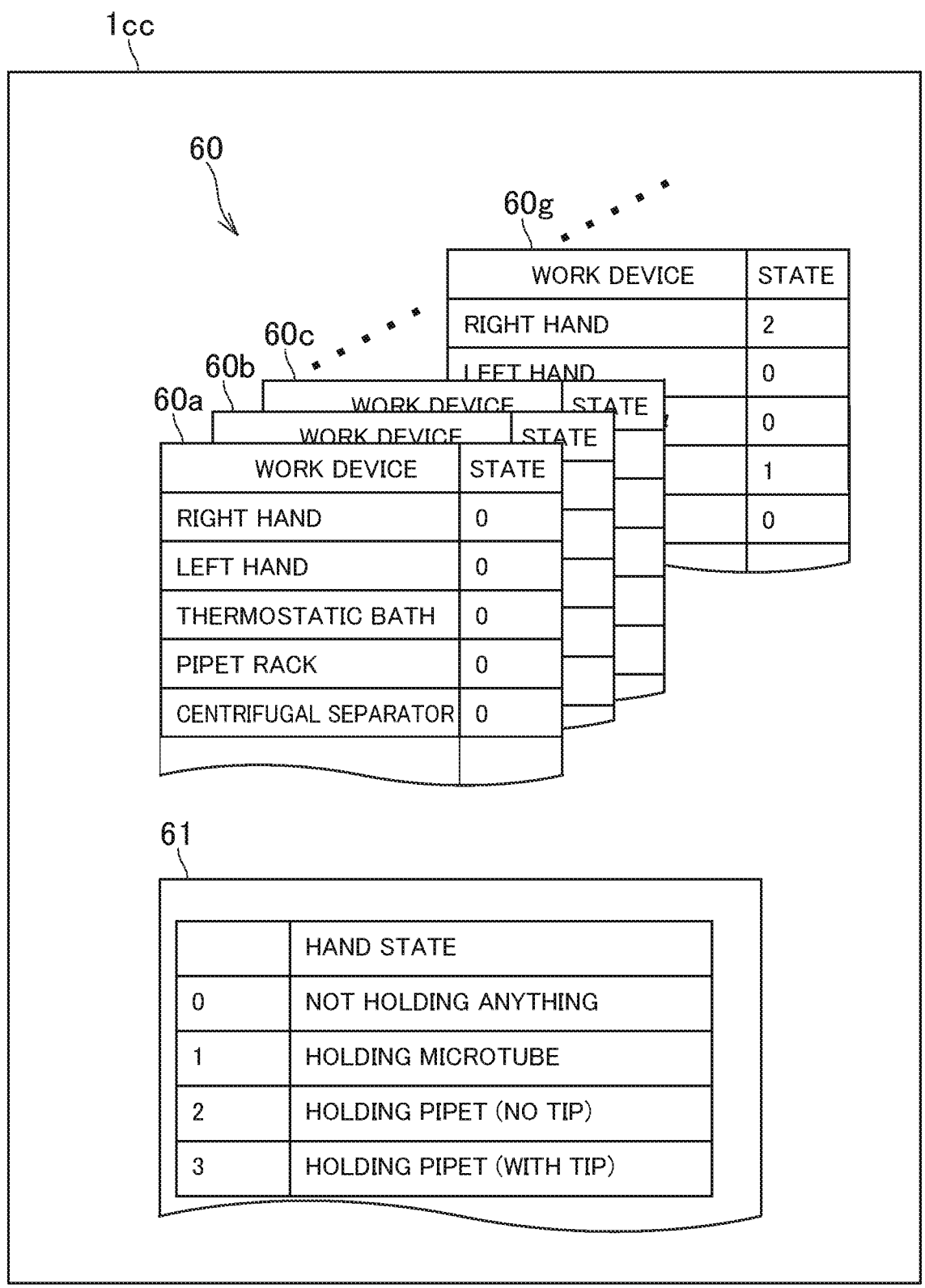
FIG. 8 is a diagram for illustrating a content example of a state database in the embodiment of the present invention.

FIG. 8 is a diagram for illustrating a content example of the state information database 1cc in the embodiment of the present invention. The state information database 1cc includes state information 60 in which the state of each work device and the robot 3 is written, and a state correspondence table 61 for showing the meaning of each of the values used in the state information 60. As the state information 60, the state information 60a to state information 60e of FIG. 7 are given here as an example. The state information 60a represents the initial state of the process system 200. The state information 60b represents the state after execution of a "MOVE" command 50, which is a movement command to the start position, and this state is the state of the work devices and the robot 3 at the start position of the unit job (Step S101) for transferring the first microtube 6 to the main rack 5b. The state information 60c represents the state after execution of a "MOVE" command 50, which is a movement command to the end position, and this state is the state of the work devices and the robot 3 at the end position of the unit job (Step S101) for transferring the first microtube 6 to the main rack 5b. The state information 60d represents the state after execution of a "MOVE" command 50, which is a movement command to the start position, and this state is the state of the work devices and the robot 3 at the start position of the unit job (Step S102) for transferring the second microtube 6 to the main rack 5b. The state information 60e represents the state after execution of a "MOVE" command 50, which is a movement command to the end position, and this state is the state of the work devices and the robot 3 at the end position of the unit job (Step S102) for transferring the second microtube 6 to the main rack 5b.

FIG. 9 is a diagram for illustrating a part of an example of the state correspondence table 61 to be referred to by the operation command generation device 1 according to the embodiment of the present invention. In each state correspondence table 61, there is shown the meanings, namely, the states specified by the values representing the state of the hands of the robot 3 and the state of the work devices to be used by the process system 200. In a first state correspondence table 61a, the meaning of the value for the state of the hands of the robot 3 is shown. Similarly, the meanings of values for the states of the thermostatic bath 9, the pipet rack 10, and the centrifugal separator 12 are shown in a second state correspondence table 61b, a third state correspondence table 61c, and a fourth state correspondence table 61d, respectively. The state correspondence table 61 is prepared for each work device having a state that is recorded as state information. The state of the process system 200 meant by any piece of state information can be grasped by referring to the state correspondence tables 61.

In the first state correspondence table 61a, a case in which nothing is held in the hands of the robot 3 is represented by the reference numeral "0", a case in which the microtube 6 is held is represented by the reference numeral "1", a case in which the pipet 4 is held but the tip 8 is not mounted to the pipet 4 is represented by the reference numeral "2", and a case in which the pipet 4 is held and the tip 8 is mounted to the pipet 4 is represented by the reference numeral "3". The range in which the pipet 4 (or tip 8) interferes with the other devices is different between a case in which the tip 8 is mounted to the pipet 4 and a case in which the tip 8 is not mounted to the pipet 4. Thus, the two cases are differentiated from each other.

In the second state correspondence table 61b, a case in which the door of the thermostatic bath 9 is closed is represented by the reference numeral "0", and a case in which the door of the thermostatic bath 9 is open is represented by the reference numeral "1". The range in which the thermostatic bath 9 interferes with the other devices is different depending on whether the door of the thermostatic bath 9 is open or closed, and hence the two cases are differentiated from each other.

In the third state correspondence table 61c, a case in which all of the pipets 4 are stored in the pipet rack 10 is represented by the reference numeral "0", a case in which the first pipet (i.e., pipet 4 stored at the leftmost position as viewed from the robot 3) has been removed from the pipet rack 10 is represented by the reference numeral "1", a case in which the second pipet (i.e., pipet 4 stored in the middle) has been removed from the pipet rack 10 is represented by the reference numeral "2", and a case in which the third pipet (i.e., pipet 4 stored at the rightmost position as viewed from the robot 3) has been removed from the pipet rack 10 is represented by the reference numeral "3". The range in which the pipet rack 10 interferes with the other devices is different depending on which pipets 4 have been removed from the pipet rack 10, and hence each case is differentiated from the others.

In the fourth state correspondence table 61d, a case in which the lid of the centrifugal separator 12 is open and the centrifugal separator 12 is stopped is represented by the reference numeral "0", a case in which the lid of the centrifugal separator 12 is closed and the centrifugal separator 12 is stopped is represented by the reference numeral "1", and a case in which the lid of the centrifugal separator 12 is closed and the centrifugal separator 12 is running is represented by the reference numeral "2". The range in which the centrifugal separator 12 interferes with the other devices is different depending on whether the lid of the centrifugal separator 12 is open or closed, and hence the two cases are differentiated from each other. Further, even when the lid of the centrifugal separator 12 is closed, there are differences in the permissible operations for the centrifugal separator 12 depending on whether or not the centrifugal separator 12 is running, and hence the cases are differentiated from each other.

It is not always required for those state correspondence tables 61 to be recorded in the state information database 1cc. Those state correspondence tables 61 may be recorded in any location that can be referred to by the user, or may be provided to the user as a printed product.

In FIG. 8, there is schematically illustrated the state information 60 generated in order by the operation command generation device 1, and recorded in the state information database 1cc. The state information 60a representing the initial state of the process system 200 may be generated by the state information generation unit 24, or may be prepared in advance in a given format. As illustrated in FIG. 7, in this embodiment, the state information 60 is successively generated and recorded at the start and end time points of each unit job. A movement command to the start position is included in the head command of the unit jobs, and a movement command to the end position is included in the tail command of the unit jobs. As a result, for each unit job, the state of the robot 3 and the work devices immediately after movement to the start position and the state of the robot 3 and the work devices immediately after movement to the end position are recorded and accumulated in the state information database 1cc as the state information 60.

For example, for the state information 60a representing the initial state illustrated in FIG. 8, the values for the right hand, the left hand, the thermostatic bath, the pipet rack, and the centrifugal separator are all zero. The state of the work devices can be grasped by referring to the state correspondence tables 61 illustrated in FIG. 9. More specifically, it can be seen from FIG. 9 that nothing is held in any of the hands included on the left and right robot arms of the robot 3, the door of the thermostatic bath 9 is closed, all of the pipets 4 are stored in the pipet rack 10, and the centrifugal separator 12 is in a stopped state with the lid opened. As the state of the robot 3, the posture of the robot 3 may be recorded in the state information 60.

Returning to FIG. 5 and FIG. 6, the unit job set generation unit 23 generates the set of unit jobs represented by the process symbol 103 in which "ADD" is written. In this case, "ADD" is a process for adding 100 µl of the solution A to each of the microtubes. This process includes a plurality of operations, namely, holding and removing the pipet 4 from the pipet rack 10 by the robot arms, mounting a tip to the distal end of the pipet 4, sucking a predetermined amount of the solution by the pipet 4, discharging from the pipet 4 a predetermined amount of the solution into each microtube placed in the main rack 5b, then discarding the tube, and returning the pipet 4 to the pipet rack 10. Therefore, the set of unit jobs represented by the process symbol 103 in which "ADD" is written includes a plurality of unit jobs. In this example, the number of microtubes to be used is two, and hence the set of unit jobs includes seven unit jobs.

First, the set of unit jobs represented by the process symbol 103 in which "ADD" is written starts from a unit job (Step S301) for holding a first pipet 4 in the hand on the right side of the robot arms. Then, a unit job (Step S401) for mounting the tip 8 to the first pipet 4, a unit job (Step S501) for sucking 200 µl of the solution A by using the first pipet 4 to which the tip 8 has been mounted, a unit job (Step S601) for discharging 100 µl of the solution A into a tube 1 by using the first pipet 4, a unit job (Step S602) for discharging 100 µl of the solution B into the tube 2 by using the first pipet 4, a unit job (Step S702) for discarding the tip 8 mounted to the distal end of the first pipet 4, and a unit job (Step S302) for returning the first pipet 4 to the pipet rack 10, are performed. As illustrated in FIG. 5 and FIG. 6, connecting jobs (Step S201 to S207) may be inserted between the unit jobs. However, in this case, the connecting jobs are generated and inserted following generation of the sets of unit jobs. The connecting jobs are described later.

As illustrated in FIG. 7, for the unit job (Step S301) for holding the first pipet 4 in the hand on the right side of the robot arms, the head command is a "MOVE" command 50 in which the target 51 is "PIPET_RACK" and the argument is "-" (i.e., none). This command 50 represents a command for causing the robot arms to move to the position of the pipet rack 10, which is the start position. The next command is a "GET" command 50 in which the target 51 is "PIPET"

and the argument is "1", which in this example represents a command for holding the target object with the hand of the right robot arm. In this case, the target object is, as represented, by "PIPET", the pipet 4, and as represented by the argument "1", the first pipet 4 is to be held. The last command is a "MOVE" command 50 in which the target 51 is "PIPET_RACK" and the argument is "-" (i.e., none). This command 50 represents a command for causing the robot arms to again move to the position of the pipet rack 10, which is the end position.

Even at the start and end time points of this unit job (Step S301), state information 60f and state information 60g are each generated by the state information generation unit 24, and stored in the state information database 1cc. At the end time point of the unit job (Step S301), the first pipet 4 has been taken from the pipet rack 10, and is being held in the hand on the right-side of the robot 3 with the tip 8 being yet to be mounted to the first pipet 4. Therefore, as illustrated in FIG. 8, in the state information 60g, in the items of "work devices", the state of "right hand" is "2", which represents "pipet held (no tip)" as shown in the state correspondence table 61a of FIG. 9. Further, in the items of "work devices", the state of "pipet rack" is "1", which represents "first pipet not present" as shown in the state correspondence table 61c of FIG. 9.

Therefore, even when the robot 3 has stopped at the end time point of the unit job for some reason (Step S301), the state of the robot 3 and the work devices can be understood by referring to the state information 60g at that time point.

The remaining unit jobs are also generated by the unit job set generation unit 23 in the same manner. To avoid needless repetition, a detailed description of the commands included in each unit job is omitted here, but the operations performed by each unit job are as follows.

Specifically, in the unit job (Step S401) for mounting the tip 8 to the pipet 4, the right robot arm holding the first pipet 4 in its hands is moved to the position of the tip rack 7, which is the start position, and the first pipet 4 is pressed downward from directly above the tip 8 held in the tip rack 7 to attach the tip 8 to the distal end of the first pipet 4. Then, the robot arms are again moved to the position of the tip rack 7, which is the end position. In the unit job (Step S501) for sucking 200 μl of the solution A, the right robot arm is moved to the position of the thermostatic bath 9, which is the start position, the distal end of the tip 8 mounted to the first pipet 4 is inserted into the container of the solution A, and 200 μl of the solution A is sucked. When the first pipet 4 is an electric pipet, this operation can be performed by transmitting an appropriate drive signal to the first pipet 4 from the robot 3 or the robot control device 2. When the first pipet 4 is a manual pipet, the operation can be performed by using the left robot arm of the robot 3 to operate the first pipet 4 held in the right robot arm. In this embodiment, the robot 3 to be used is a dual-arm robot having two or more robot arms, and hence commercially-available work devices designed based on the assumption of being operated by humans can be used without a problem. Therefore, it is not required to prepare a special work device for the process system 200. Next, the robot arms are again moved to the position of the thermostatic bath 9, which is the end position.

Figure 10:
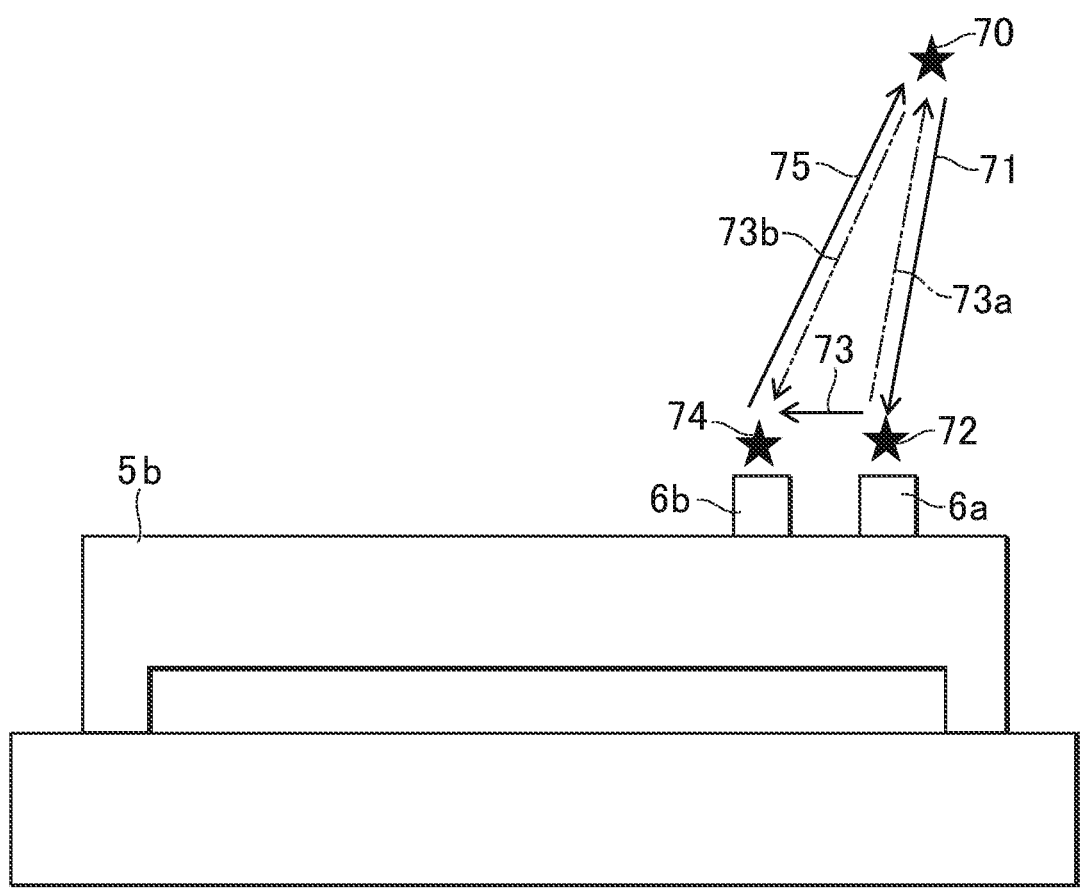
FIG. 10 is a diagram for illustrating movement of robot arms.

Next, the unit job (Step S601) for discharging the solution A into the tube 1 and the unit job (Step S602) for discharging the solution B into the tube 2 are consecutively generated, and are serially connected in order. The movements by the robot arms in those steps are described with reference to FIG. 10.

First, in the unit job (Step S601), the robot arms are moved to a position 70 of the main rack 5b, which is the start position, and are then, as indicated by an arrow line 71, moved to a position 72 at which the tip 8 is positioned directly above a first microtube 6a placed in the main rack 5b. Then, the distal end of the tip 8 mounted to the first pipet 4 is inserted into the first microtube 6a, and 100 μl of the solution A is discharged. The robot arms are then raised to the position 72, which is a position at which the distal end of the tip 8 has been withdrawn from the first microtube 6a. In a normal case, as indicated by an arrow line 73a, the robot arms are moved to the position 70 of the main rack 5b, which is the end position. However, in this case, as a special example, the movement to the end position is discarded, and hence the position of the robot arms remains at the position 72.

In the subsequent unit job (Step S602), in a normal case, first, the robot arms are moved to the position 70 of the main rack 5b, which is the start position. However, in this case, as a special example, the movement to the start position has been discarded, and hence the position of the robot arias stays at the position 72, at which the distal end of the tip 8 has been withdrawn from the first microtube 6a. Then, as indicated by an arrow line 73, the robot arms are moved to a position 74 at which the tip 8 is positioned directly above a second microtube 6b placed in the main rack 5b. This movement is a movement command to the position 74, in which the movement from the position 70 to the position 74 as indicated by an arrow line 73b when the robot arms are at the position 70, which is the initial position, is changed due to the fact that the robot arms are still at the position 72. The distal end of the tip 8 mounted to the first pipet 4 is inserted into the second microtube 6b, and the remaining 100 μl of the solution A is discharged. The robot arms are then raised to a position at which the distal end of the tip 8 has been withdrawn from the second microtube 6b, and then as indicated by an arrow line 75, the robot arms are moved as normal to the position 70 of the main rack 5b, which is the end position.

Those two unit jobs perform the same type of operation, namely, discharge the same amount of the same solution A to the microtube 6 placed in the main rack 5b. The only difference between those two jobs is the microtube 6 into which the solution A is discharged. The different microtubes 6 are inserted into and supported in adjacent holes of the main rack 5b, and hence those two unit jobs can be said to be unit jobs in which the start position and the end position are the same, and only the position of the microtube 6, which is the work position, has been offset. This is because the pitch between the adjacent holes of the main rack 5b is known.

For such consecutive unit jobs that perform the same type of operation, the unit job set generation unit 23 discards the movement command to the end position included in the previous unit job, which is the unit job in this case (Step S601), and the movement command to the start position included in the subsequent unit job, which is the unit job in this case (Step S602). As a result, as described above, after the previous unit job (Step S601) is executed, the robot arms perform an operation in which, from the position at which the distal end of the tip 8 has been withdrawn from the first microtube 6, the distal end of the tip 8 mounted to the first pipet 4 is directly inserted into the second microtube 6. As a result of performing the operation in this manner, when consecutive operations of the same type are executed, needless movement of the robot arms back and forth from the start position (or the end position) of those unit jobs each time is omitted, which improves operation efficiency. In terms of the example of FIG. 10, this means that if the operation for moving the robot arms from the position 72 to the position 74 were not omitted, as indicated by the arrow lines 73a and 73b, the operation would be detour via the position 70, which is inefficient. The operation indicated by the arrow 73 is shorter, and more efficient than such an operation.

Next, the unit job (Step S702) for discarding the tip 8 mounted to the distal end of the first pipet 4 is generated. In this unit job, the robot arms are moved to the position of the dustbin 13, which is the initial position. This position is the position at which the first pipet 4 held in the right robot arm is directly above the dustbin 13. In this state, the robot 3 causes the tip 8 of the distal end of toe first pipet 4 to be separated from the first pipet 4. The separated tip 8 drops into the dustbin 13, and is discarded. The separation of the tip 8 from the first pipet 4 can be performed by, for example, pressing a tip release button of the first pipet 4 by the left robot arm, or when the first pipet 4 is an electric pipet, by transmitting a tip separation signal from the robot 3 or the robot control device 2. Then, the robot arms are moved to the position of the dustbin 13, which is the end position. In this unit job (Step S702), there is no change to the position of the robot arms, and hence the robot arms do not move. For the tail command in the unit job (Step S702), a movement command to the end position may be included (in this case, the command is simply ignored by the robot control device 2), or the movement command itself may be discarded. In this embodiment, the movement command to the end position is kept as it is.

Lastly, the unit job (Step S302) for returning the first pipet 4 to the pipet rack 10 is generated. In this unit job, the robot arm moves to the position of the pipet rack 10, which is the start position, the first pipet 4 held in the hand of the right robot arm is then returned to its original position in the pipet rack 10, the holding of the first pipet 4 is released, and then the robot arm moves to the position of the pipet rack 10, which is the end position.

Based on the seven unit jobs described above, the set of unit jobs represented by the process symbol 103 in which "ADD" is written is generated. The unit job set generation unit 23 then generates a set of unit jobs based on a command definition corresponding to a process symbol 103, which is a work command. The command definition is extracted from the command definition database 1ca by the command definition extraction unit 22 illustrated in FIG. 3.

Figure 11:
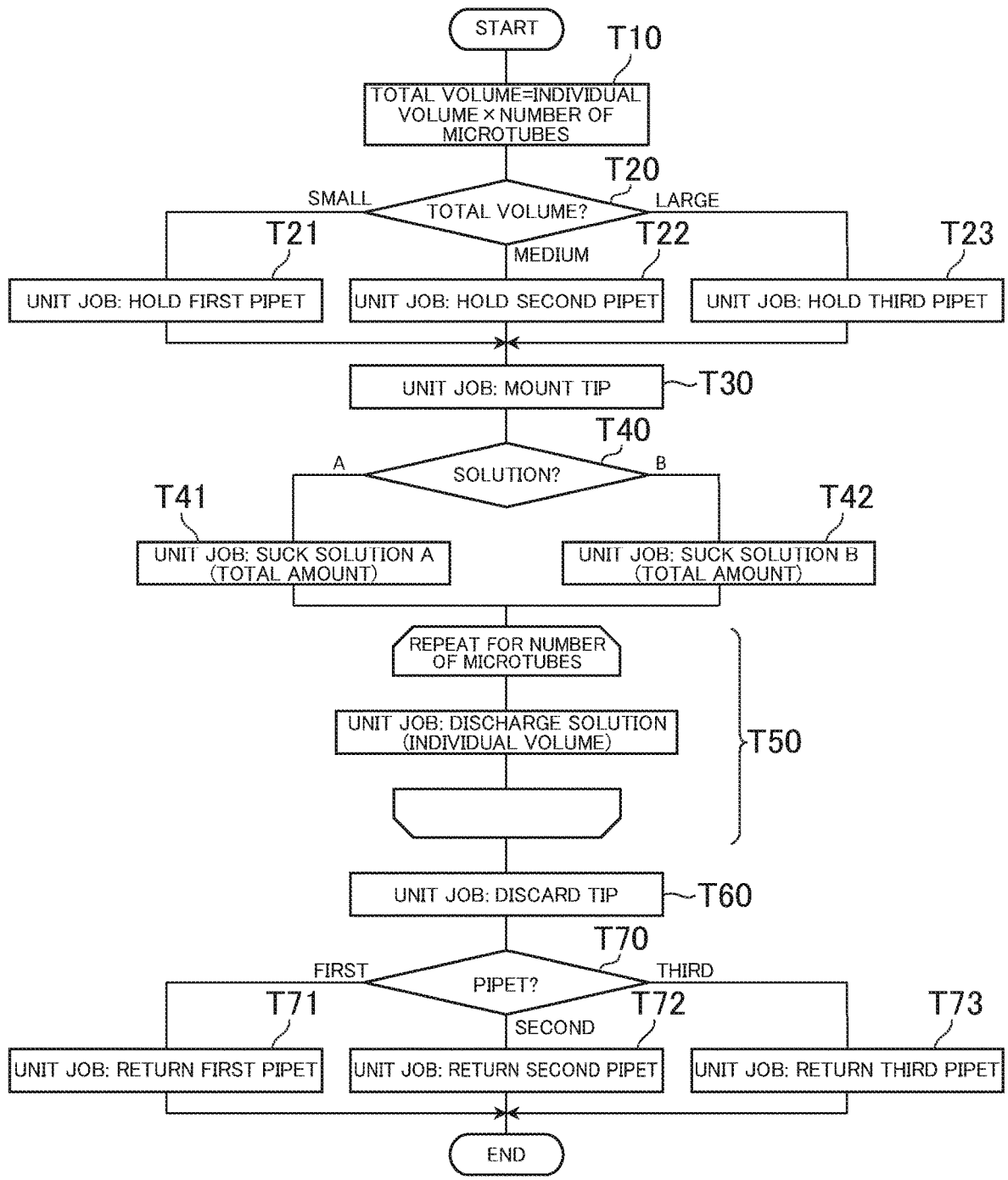
FIG. 11 is a schematic diagram for illustrating an example of a command definition.

FIG. 11 is a schematic flowchart for illustrating an example of a command definition. The command definition illustrated in FIG. 11 is a command definition of a process symbol 103 in which the "ADD" shown in this example is written. The data format of the command definition itself is not particularly limited, and may be written in any format. Therefore, the flowchart illustrated in FIG. 11 is a schematic illustration of the command definition.

As described above, each command definition defines at least one order and combination of the unit jobs to be used for each work command. As described later, the command definition can include a control command, such as a conditional branch or repetition in accordance with a work command or another condition, and an argument calculation. In the set of unit jobs generated by the unit job set generation unit 23, the unit jobs are consecutively arranged in series, and the argument is a fixed value or is referred to as a variable that does not require dynamic calculation. A flow for generating a set of unit jobs by the unit job set generation unit 23 from a process symbol 103 in which "ADD" is written is now described based on the command definition of FIG. 11 as an example.

The unit job set generation unit 23 generates a set of unit jobs by interpreting the command definition in order from the top of FIG. 11 in the same manner as a normal flow (algorithm). First, in Step T10, the total amount of required solution is calculated. The total amount is the product of the amount (individual volume) of the solution to be added to each microtube 6 and the number of microtubes. In this example, as illustrated in FIG. 4, the individual volume indicated by the process symbol 103 in which "ADD" is written is 100 µl, and as indicated by the container count symbol 105, the number of microtubes is two. Therefore, the total amount is 200 µl. In this way, an argument calculation may be included in the command definition.

Next, in Step T20, the pipets 4 to be used are determined based on a conditional branch in accordance with the calculated total amount. In this example, based on the assumption that a first pipet, a second pipet, and a third pipet are prepared in ascending order of volume, it is determined that 200 µl is a small volume in accordance with the total amount.

As a result, the processing is advanced to Step T21, and a unit job (Step S301) for holding the first pipet is generated. This unit job is stored in advance in the unit job group storage unit 1cb of FIG. 3. The unit job set generation unit 23 calls the required unit job from the unit job group storage unit 1cb. The unit jobs for holding the second pipet and the third pipet, which have a different capacity, are also stored in advance in the unit job group storage unit 1cb, and the unit job corresponding to the selected pipet is called (Steps T22 and T23). Differences in the position in which each pipet is stored in the pipet rack 10, differences in the holding position based on differences in pipet shape, and differences in how much the hands are open or closed are reflected in advance in the unit jobs stored in the unit job group storage unit 1cb, and hence differences in the operation of the robot 3 due to command definition condition or differences in work device are handled. When there has been an update to a work device (e.g., when the pipet 4 has been replaced with a product having a different shape), only the relevant unit job stored in the unit job group storage unit 1cb is corrected, and hence updates and changes to the configuration of the process system 200 can be handled flexibly.

Next, in Step T30, the unit job (Step S401) for mounting the tip 8 is called from the unit job group storage unit 1cb and generated. Then, whether the solution to be added to the sample is the solution A or the solution B is determined based on a conditional branch. In this example, the solution A is specified by the process symbol 103 in which "ADD" is written. Therefore, Step T41 is selected, the unit job for sucking the solution A is called from the unit job group storage unit 1cb, and the total amount of 200 µl calculated in Step T10 is passed and reflected as the argument. When the solution B is specified, the processing is advanced to Step T42, and the unit job for sucking the solution B is called from the unit job group storage unit 1cb. In this way, the unit jobs are different depending on the solution to be sucked, which enables differences in the arrangement position of the solutions, and cases requiring a special technique (e.g., when it is required to suck the solution after the solution has been stirred by repeating suction and discharge several times) suited to the solution when the solution is sucked, to be handled flexibly.

The processing is then advanced to Step T50, and the unit jobs (Step S601 and Step S602) for discharging the solution into as many microtubes 6 as the number indicated by the container count symbol 105 are generated by calling each unit job in turn from the unit job group storage unit 1cb. At this point, in each of those unit jobs, 100 μl is passed and reflected as the argument. The unit jobs that are called in turn in this step are the same type of operation, originally have the same start and end positions, and only the work positions are offset. Therefore, for each of the unit jobs, as the work position, an offset value is calculated by the state information generation unit 24, and the calculated value is passed and reflected. Further, as described above, the movement command to the end position included in the previous unit job (Step S601) and the movement command to the start position included in the subsequent unit job (Step S602) are discarded.

Next, in Step T60, the unit job (Step S702) for discarding the tip 8 is called from the unit job group storage unit 1cb and generated. Lastly, in Step T70, the used pipet is determined based on a conditional branch, and the unit job (Step S302) for returning the pipet to its proper position in the pipet rack 10 is called from the unit job group storage unit 1cb and generated. In this case, the first pipet 4 has been used. Therefore, the processing is advanced to Step T71, and the first pipet 4 is returned to the position in which the first pipet 4 was originally stored in the pipet rack 10. When the other pipets are selected, the unit job (Step T72 or T73) for returning the relevant pipet to its proper position is called from the unit job group storage unit 1cb and generated.

The sets of unit jobs are generated based on the above-mentioned operations by the unit job set generation unit 23. Therefore, even for work commands of the same type, the unit jobs executed by the robot 3 change. For example, depending on the conditions and the command definitions to be applied, the unit jobs generated based on the conditional branches are different, or the number of unit jobs to be generated is different due to a difference in the number of repetitions. In this way, the sets of unit jobs are generated by referring to the command definitions, and hence the sets of unit jobs can be flexibly generated for work commands requiring a complex procedure in accordance with the processing conditions, which allows a highly versatile process system 200 to be implemented. Further, the unit jobs are called from the unit job group storage unit 1cb, and are not themselves included in the command definitions, and hence change to the process system 200 and the work devices can be handled flexibly, and the work time and effort can be reduced.

Returning to FIG. 4, the unit job set generation unit 23 then generates the set of unit jobs from the remaining process symbol 103 in which "CENTRIFUGE" is written. Similarly to the above description, this operation is also performed by a command definition corresponding to "CENTRIFUGE" being extracted by the command definition extraction unit 22 from the command definition database 1ca; the unit jobs being called from the unit job groups stored in the unit job group storage unit 1cb and arranged in order based on the command definition; and an argument being calculated, passed, and reflected as required. In this case, as illustrated in FIG. 7, a unit job (Step S103) for transferring the first microtube 6 from the main rack 5b to the centrifugal separator 12, a unit job (Step S104) for transferring the second microtube 6 from the main rack 5b to the centrifugal separator 12, and a unit job (Step S801) for performing centrifugation by operating the centrifugal separator 12 are generated as the set of unit jobs. However, a detailed description of those unit jobs is omitted here.

Lastly, the unit job set generation unit 23 generates a set of unit jobs from the end symbol 101 in which "PUT" is written. The operation is also performed in a similar manner, in which a command definition corresponding to "PUT" is extracted by the command definition extraction unit 22 from the command definition database 1ca, and then the set of unit jobs is generated based on that command definition. In this case, a unit job (Step S105) for removing the first microtube 6 from the centrifugal separator 12 and transferring the first microtube 6 to the tube rack 5a and a unit job (Step S106) for removing the second microtube 6 from the centrifugal separator 12 and transferring the second microtube 6 to the tube rack 5a are generated as the set of unit jobs. As a result of this operation, all of the unit jobs corresponding to the work commands written in the protocol chart exemplified in FIG. 4 are generated and arranged in series.

However, just based on this set of unit jobs, for those two unit jobs, there is no consideration given to the movement path of the robot arms from the end position of the previous unit job and the start position of the subsequent unit job. Therefore, the robot arm itself, or an object held in the hand of the robot arm, may interfere with another object. To avoid this problem, a connecting job illustrated in FIG. 3 is generated by the connecting job generation unit 25.

The connecting job is at least generated as a job to be inserted between consecutive work commands. In this embodiment, the connecting job is generated as a job to be inserted between consecutive unit jobs. However, as described later, it is not always required for a connecting job to be inserted between each instance of consecutive unit jobs. For example, one of those consecutive unit jobs may not be generated, or a generated unit job may be discarded or skipped.

Generation of a connecting job by the connecting job generation unit 25 is described by using the connecting job (Step S201) between the unit job (Step S102) for transferring the second microtube 6 to the main rack 5b and the unit job (Step S301) for holding the first pipet 4 of FIG. 5 as an example.

In this example, the end position of the unit job (Step S102) for transferring the second microtube 6 to the main rack 5b is the position of the main rack 5b, and the start position of the unit job (Step S201) for holding the first pipet 4 in the hand on the right side of the robot arms is the pipet rack 10. Therefore, those end position and start position are not the same. Thus, for consecutive unit jobs, in a case where the end position of the previous unit job and the end position of the subsequent unit job are different, when a connecting job is not inserted, the robot arms move in a linear manner from the end position of the previous unit job to the start position of the subsequent unit job based on a movement command to the start position included in the head command of the subsequent unit job. Depending on the arrangement of the work devices and the object held in the robot hands, the path of this linear movement may interfere with another device.

Therefore, the connecting job generation unit 25 generates a connecting job (Step S201), which is a collection of movement commands to the position of the pipet rack 10 from the position of the main rack 5b based on the position of the main rack 5b, the position of the pipet rack 10, and the state written in the state information database 1cc. The connecting job is a job that causes the robot arms to move along a path having as short a movement distance as possible, or as short a movement time as possible, while avoiding interference between the robot arms and a device.

The connecting job generation unit 25 automatically generates a path for the robot arms that avoids interference with obstacles. When generating the path, the connecting job generation unit 25 refers to the state information database 1cc, and takes into account held-object information representing whether or not an object is held in the hands of the robot arms and what is held, and state information such as work device state information on a work device, in particular, whether or not a lid or a door of the various devices included devices is open. As a result of this, a work model that depends on the state information may be read and used from the work model storage unit 1ce. A known algorithm may be used as the algorithm for automatically generating the path of the robot arms. For example, a probabilistic roadmap method (PRM) may be used in which several robot arm postures free from interference with obstacles are randomly generated, and a path is generated based on a graph search algorithm from a roadmap in which those postures are connected. As a graph search algorithm for generating the shortest path from the provided roadmap, the Dykstra method or an A* algorithm, which is an improvement of the Dykstra method, may be used. Examples of other algorithms that can be used for automatically generating the path include a rapidly-exploring random trees (RRT) algorithm, in which several path trees free from interference with obstacles are randomly generated based on a start time point of the operation as a reference point, and random generation of path trees is repeated based on the ends of the path trees as new reference points, a sampling-based roadmap of trees (SRT) algorithm combining PRM and RRT, and a rapidly-exploring roadmap (RRM). The algorithm for automatically generating the path is not limited to those algorithms that randomly generate robot arm postures, and other methods may be used, for example, a potential-based method in which a potential that has a lower value at the arrival position of the robot arms and a higher value at the position of an obstacle is introduced, and the robot arms are moved along a gradient of the potential.

As illustrated in FIG. 3, the generated connecting job is stored in the connecting job storage unit 1cd. At this stage, the generated connecting job and the state information before and after that connecting job may be associated with each other, or the connecting job and the state information may be stored together in the connecting job storage unit 1cd.

In FIG. 7, there is illustrated a connecting job (Step S201) from the main rack 5b to the pipet rack 10. The connecting job (Step S201) from the main rack 5b to the pipet rack 10 includes a "CONNECT" command 50, a "MAIN_RACK: PIPET_RACK" target 51, and five arguments 52. The target 51 represents the start position (i.e., position of the main rack 5b) and the end position (i.e., position of the pipet rack 10) of the connecting job.

The connecting job generation unit 24 refers to the state information 60e, which represents the immediately-before state of the robot 3 and the devices operated by the robot 3. The state represented by the state information 60e is a state in which the second microtube 6b has been placed in the main rack 5b, the hands have been moved to the position of the main rack 5b, nothing is held in the hands, and the state of all of the devices is an initial state. Therefore, the content of a third state table 60d is the same as the content of a first state table 60b. In FIG. 7, the information acquired from the state information database 1cc is represented as the argument 52. Among the arguments 52, "HAND_R=0, HAND_L=0" represents the fact that nothing is held in the left and right hands, "BATH=0" represents the fact that the door of the thermostatic bath 9 is closed, "PIPE-T_RACK=0" represents the fact that all of the pipets 4 are stored in the pipet rack 10, and "CENTRIFUGE=0" represents the fact that the lid of the centrifugal separator 12 is open and the centrifugal separator 12 is stopped. Based on those arguments 52, the connecting job generation unit 24 reads the state of the devices, and generates a movement path of the robot arms that is free from interference with the devices.

Here, as described above, the connecting job generation unit 24 does not necessarily generate and insert a connecting job into all of the positions between consecutive unit jobs. As a first exception, for adjacent unit jobs between which a connecting job is to be generated and inserted, when the end position of the previous unit job and the start position of the subsequent unit job are the same, generation per se of the connecting job is shipped. This is because even when a connecting job is not inserted between those unit jobs, it is not required to move the robot arms. At this point, the end position of the previous unit job and the start position of the subsequent unit job are obtained by referring to the movement command 50 to the start position and to the movement command 50 to the end position in the unit jobs generated by the unit job set generation unit 23, a part of which is illustrated in FIG. 7. The end position of the previous unit job and the start position of the subsequent unit job are also obtained by referring to the state information at the end time point of the previous unit job and the state information at the start time point of the subsequent unit job. In any case, state information is to be referred to when the connecting job is generated, and hence, in this embodiment, the state information at the end time point of the previous unit job and the state information at the start time point of the subsequent unit job are referred to.

A second exception is when the generated connecting job is equivalent to a simple linear movement command. In this case, the generated connecting job is substantially the same as a movement command to the start position executed by the head command of the subsequent unit job, and hence it is not required to insert a connecting job. This discrimination is performed by generating a connecting job and determining whether or not the connecting job is equivalent to a simple linear movement command. When the connecting job is equivalent to a simple linear movement command, the generated connecting job is discarded.

A third exception is when the connecting job to be inserted is the same as a connecting job that has already been generated. In this case, generation of the path of a connecting job that has already been generated each time by using a path search algorithm places an unnecessary calculation load on the robot operation command generation device 1, requires time for the generation of the robot operation command, and causes productivity to deteriorate. Therefore, the third exception is to prevent re-generation of the same connecting job.

The determination of whether a connecting job is the same as a connecting job that has already been generated is performed by comparing, for adjacent unit jobs between which the connecting job is to be inserted, the state information at the end time point of the previous work command and the state information at the start time point of the next work command with those of the connecting job that has already been generated. More specifically, even when the start position (end position of the previous unit job) of the connecting job and the end position (start position of the subsequent unit job) of the connecting job are the same, a movement path that is appropriate as a connecting job may be different due to differences in the state of the process system 200, for example, differences in the object held in the robot hands, or differences in the state of the work devices, for example, whether or not the lid or the door is open or closed. Therefore, the third exception is provided because the same connecting job is generated when the state information at the end time point of the previous unit job and at the start time point of the subsequent unit job is the same.

When there is a connecting job, which hats the same state information immediately before or immediately after the connecting job to be generated, has already been generated by the connecting job generation unit 25, and stored in the connecting job storage unit 1cd, a connecting job is not newly generated, and the already-generated connecting job stored in the connecting job storage unit 1cd is called.

In the connecting job storage unit 1cd, the connecting job generated by the connecting job generation unit 25 is stored together with the state information on the immediately-before or immediately-after connecting job, or is stored in association with o the state information on the immediately-before or immediately-after connecting job. Therefore, when a new connecting job is to be generated, the connecting job generation unit 25 can discriminate whether or not the connecting job to be generated has already been generated or is to be newly generated by referring to the state information immediately-before or immediately-after the position into which the connecting job is to be inserted in the connecting job storage unit 1cd.

Figure 12:
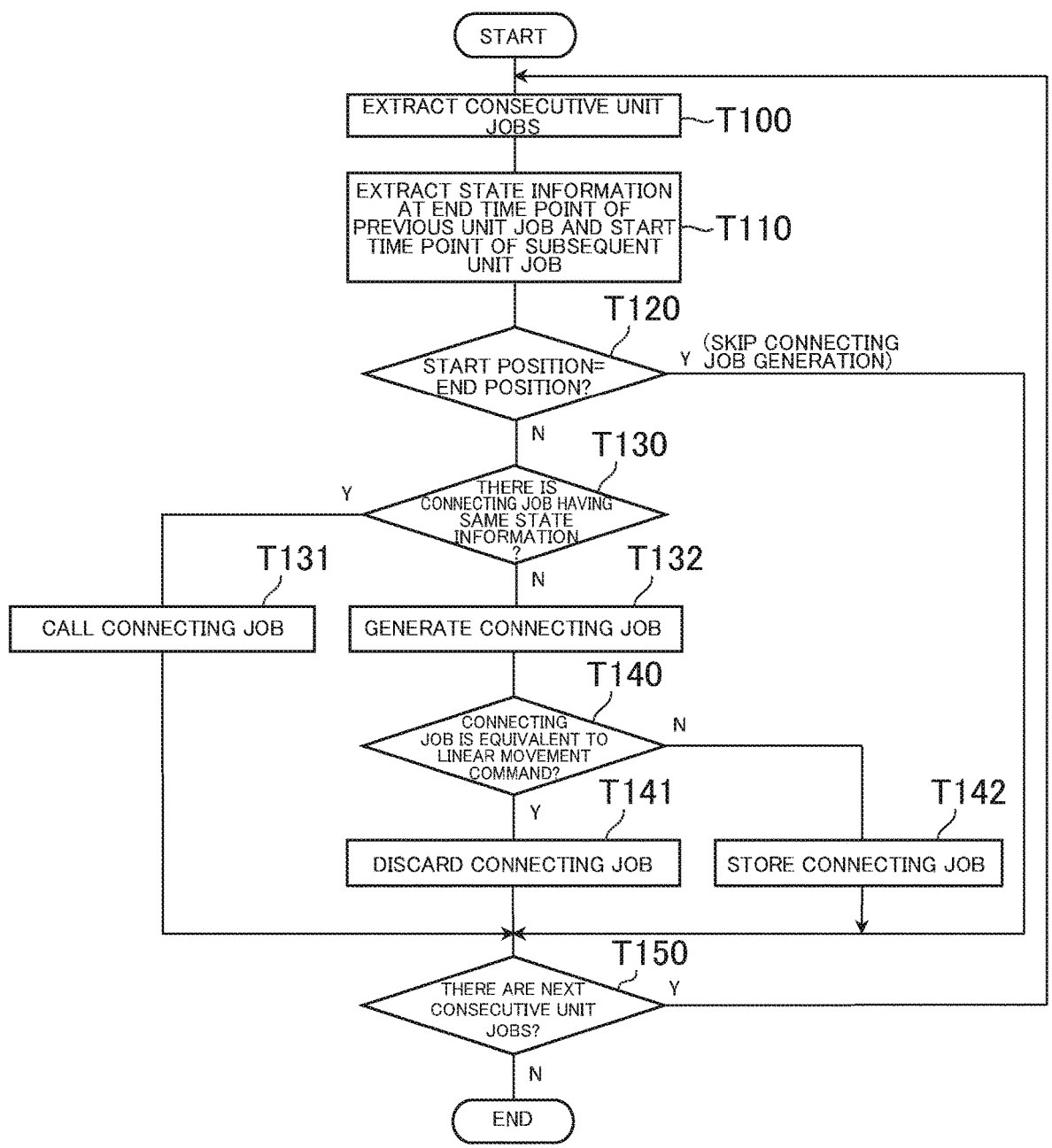
FIG. 12 is a flowchart of connecting job generation to be executed by a connecting job generation unit.

FIG. 12 is a flowchart of connecting job generation executed by the connecting job generation unit 25. First, a connecting job is a job to be inserted between consecutive unit jobs, and hence the connecting job generation unit 25 refers to the unit jobs generated by the unit job set generation unit 23 in order from the top, and extracts the consecutive unit jobs (Step T100). It is then determined whether or not a connecting job is to be inserted, or is to be generated, between the extracted unit jobs.

Next, among the extracted consecutive unit jobs, the state information on the end time point of the previous unit job and the start time point of the subsequent unit job is extracted from the state information database 1cc (Step T110). Then, based on the extracted state information, the connecting job generation unit 25 determines whether or not the start position (end position of the previous unit job) and the end position (start position of the subsequent unit job) of the connecting job to be inserted are the same (Step T120). When the start position and the end position are the same (Step T120: Y), this means that it is not required to insert a connecting job, and hence connecting job generation is skipped, and the processing is advanced to Step T150.

When the start position and the end position of the connecting job to be generated are not the same (Step T120: N), the connecting job generation unit 25 determines whether or not a connecting job having the same state information at the start time point and the end time point as the connecting job to be inserted has already been generated and stored in the connecting job storage unit 1cd (Step T130). This determination can be easily performed by, as described above, referring to state information stored together with, or in association with, the connecting job stored in the connecting job storage unit 1cd. When there is such a connecting job already stored (Step T130: Y), that stored connecting job is called from the connecting job storage unit 1cd (Step T131), and the processing is advanced to Step T150.

When a connecting job having the same state information is not present (Step T130: N), this means that a new connecting job is required, and hence the connecting job generation unit 25 generates a connecting job based on the extracted state information (Step T132).

The connecting job generation unit 25 determines whether or not the generated connecting job is equivalent to a simple linear movement command (Step T140). When the connecting job is equivalent to a simple linear movement command (Step T140: Y), the generated connecting job is discarded (Step T141), and the processing is advanced to Step T150. When the connecting job is not equivalent to a simple linear movement command (Step T140: N), the generated connecting job is stored in the connecting job storage unit 1cd together with the state information at the start time point and the state information at the end time point of the connecting job (or information associated therewith).

Based on the processing performed up to this point, for the consecutive unit jobs that are being focused on, it is determined whether or not a connecting job is to be generated, called, discarded, or generation is to be skipped. Next, the connecting job generation unit 25 determines whether or not there are consecutive unit jobs between which a connecting job is to be inserted (Step T150). When there are still more unit jobs generated by the unit job set generation unit 23, and there are consecutive unit jobs (Step T150: Y), the processing is returned to Step T100, and the above-mentioned operations are repeated. When there are no consecutive unit jobs (Step T150: N), this means that the processing regarding consecutive unit jobs between which a connecting job may be inserted is all finished, and hence the processing ends.

Returning to FIG. 3, lastly, the generated unit jobs and connecting job (s) are sent to the robot operation command generation unit 27. The robot operation command generation unit 27 merges the generated unit jobs and connecting job (s) in series as a continuous order set to generate a robot operation command. The generated robot operation command is stored in the robot operation command storage unit 1cf.

In the robot operation command illustrated in FIG. 5 and FIG. 6, there are illustrated connecting jobs that have been inserted between the unit jobs in this way. In this case, linear movement is possible between the position of the main rack 5b, which is the end position of the unit jobs S101 for transferring the first microtube to the main rack 5b from the tube rack 5a, and the position of the tube rack 5a, which is the start position of the unit job S102 for transferring the second microtube to the main rack 5b from the tube rack 5a, and hence the connecting job generated by the connecting job generation unit 25 is discarded.

However, the connecting job S201 connecting from the position of the main rack 5b to the position of the pipet rack 10 is generated and inserted between the unit job S102 and the unit job S301 for holding the first pipet 4. Similarly, the connecting job S202 connecting from the position of the pipet rack 10 to the position of the tip rack 7 is generated and inserted between the unit job S301 and the unit job S401 for mounting the tip 8, and the connecting job S203 connecting from the position of the tip rack 7 to the position of the thermostatic bath 9 is generated and inserted between the unit job S401 and the unit job S501 for sucking the solution A. The subsequent connecting jobs S204, S205, S206, and S207 are similarly generated and inserted.

The unit job S601 for discharging the solution A to the first microtube 6 and the unit job S602 for discharging the solution A to the second microtube 6 are, as described above, consecutive unit jobs for performing the same type of operation, and hence the start position and the end position for both of those unit jobs are the same position, namely, the main rack 5b. Therefore, generation of a connecting job between those consecutive unit jobs S601 and S602 is skipped, and a connecting job is not inserted.

Between the unit jobs S103 and S104, there is a movement for connecting the position of the centrifugal separator 12 to the position of the main rack 5b, and between the unit jobs S105 and S106, there is a movement for connecting the position of the tube rack 5a to the position of the centrifugal separator 12. However, both of those movements are linear movements, and hence the generated connecting job is equivalent to a simple linear movement command, and the generated connecting job is discarded. As a result, a connecting job is not generated between those unit jobs.

Between the unit job S104 and the unit job S801, and between the unit job S801 and the unit job S105, the start position and the end position are the position of the centrifugal separator 12 in each case, which means that the start position and the end position of the connecting job are the same. Therefore, generation of a connecting job is skipped, and a connecting job is not generated between those unit jobs.

The robot operation command stored in the robot operation command storage unit 1cf is read by the robot operation command display unit 28 based on a command from the user or another command, and displayed as appropriate on the monitor 1h. The robot operation command is also read by the robot operation command output unit 29 and output to the robot control device 2. The robot control device 2 causes the robot 3 to operate by executing the robot operation command, and work is executed by the process system 200 in accordance with the overall work flow.

As described above, the robot operation command generated by the robot operation command generation device 1 according to this embodiment is generated, like in the example illustrated in FIG. 5 and FIG. 6, as a robot operation command in which unit jobs and connecting jobs are consecutively connected in series, and does not include so-called control commands as referred to in computer control, such as conditional branching and repeat. Therefore, the calculation load on the robot control device 2 is small, and the state of the process system 200 during execution is uniquely determined. As a result, even when operation has stopped midway through execution, the state of the process system 200 can be easily known from the progress state of the robot operation command. Further, the overall time, which is the time required to execute the whole robot operation command, can be predicted in advance without actually operating the robot 3 or performing a simulation of the overall operation.

FIG. 13 is a diagram for schematically illustrating a unit job group 300 stored in the unit job group storage unit 1cb. The unit job group 300 is stored in advance in the unit job group storage unit 1cb as a collection of the unit jobs to be executed by the robot 3 in the process system 200. The unit jobs stored in the unit job group storage unit 1cb are read as required by the unit job set generation unit 23, and the required parameters are applied as the unit jobs forming the robot operation command.

In the unit jobs included in the unit job group 300, in addition to the commands to be executed by the robot control device 2, there is also stored the time required by the robot 3 in order to execute each of the unit jobs. For example, as illustrated in FIG. 13, the unit job for transferring a microtube from the tube rack 5a to the main rack 5b takes 10 seconds. The required time is given in advance when the unit job is registered in the unit job group 300. The required time may be obtained by actually operating the robot 3 and measuring the time taken, or obtained by using a computer simulation to virtually recreate the operation corresponding to the unit job and measuring the time taken.

It is not always required for the required time for each unit job to be accurate, the required time may be a rough approximation. For example, the time taken for the unit job for transferring a microtube from the tube rack 5a to the main rack 5b given in the above-mentioned example may slightly differ depending on which microtube 6 is to be transferred. However, such a difference is not considered to have a large impact on the overall work time, and hence a representative time, an average time, and the like may be employed. In this example, the time taken for transfer of the first microtube is employed as a representative time.

It is not always required for the required time for each unit job to be given as a fixed value. For example, for the unit job for performing a centrifugation process shown in FIG. 13, the time required in order to operate the centrifuge may be considered to be roughly fixed, but the time required for the centrifugation itself is given by the work command, and is not constant. In such a case, a fixed time and a variable time may be given in the unit job group storage unit 1cb as the required time of the unit jobs, and the variable time may change based on the parameter given to the work command. For the centrifugation process illustrated in this example, the fixed time is 20 seconds, which is the time it takes for the robot 3 to operate the lid of the centrifugal separator 12 and to operate the button switch. On the other hand, the variable time is represented as X, which is the time of the centrifugation itself. Therefore, in the protocol chart illustrated in FIG. 4, this time is indicated as 3 minutes (180 seconds), and hence the centrifugation process in this example takes 200 seconds.

FIG. 14 is a diagram for schematically illustrating a connecting job stored in the connecting job storage unit 1cd. When the connecting jobs are generated by the connecting job generation unit 25, the generated connecting jobs are sequentially stored in the connecting job storage unit 1cd.

At this stage, in order to predict the overall operation time, it is required to estimate the required time it takes for the robot 3 to execute the newly generated connecting jobs. Therefore, as illustrated in FIG. 3, the connecting jobs generated by the connecting job generation unit 25 are also sent to the connecting job simulator 26, and virtually executed by computer simulation to obtain an estimate of the time for the operation. The estimated required time is stored in the connecting job storage unit 1cd, and as illustrated in FIG. 14, the required time for each stored connecting job is stored.

The connecting job simulator 26 may estimate the required time simply by performing an operation simulation of the robot 3. However, the connecting job simulator 26 may run, in a virtual space, not only the robot 3 but also a work model, which is a three-dimensional model of devices including the work devices to be used by the process system 200. In this case, the connecting job simulator 26 may refer to a work model stored in the work model storage unit 1ce to investigate the presence of interference between models by running the work model in a virtual space. The investigation result is fed back to the connecting job generation unit 25, which enables the connecting job generation unit 25 to generate a connecting job based on a path in which interference does not occur between models.

Returning to FIG. 3, the overall work time prediction unit 30 predicts the overall time, which is the time required to execute the overall work flow, in response to, for example, an appropriate instruction from the user. For this prediction, it is not required to perform another simulation. The overall time may be predicted by referring to the robot operation command, calculating the required time for each unit job included in the robot operation command by referring to the unit job group storage unit 1cb, calculating the required time for each connecting job by referring to the connecting job storage unit 1cd, and adding up each of those required times. Prediction of the execution time of the work flow does not require a prolonged calculation (simulation) or actual operation by the actual robot 3.

The predicted overall time is displayed on the monitor 1h by the overall work time display unit 31. As a result, the user can grasp the time required to execute the overall processing, which is convenient because, for example, when the user wishes to obtain the processing result at a desired date and time, the user is allowed to grasp in advance how far ahead the work is to be started, and how many times the processing can be repeated and executed within a predetermined period, without operating the actual machine.

In this embodiment, the position of the robot 3 performing the operations is specified based on a robot coordinate system $S_R$ having an origin in the robot 3. In contrast, the position of the unit jobs included in the unit job group stored in the unit job group storage unit 1cb may be specified based on a local coordinate system $S_L$ defined for each work device handled in the unit job. The unit jobs may also include a coordinate system specification command for specifying the local coordinate system $S_L$ and a movement command based on the local coordinate system $S_L$. The reason for this is described with reference to FIG. 15 by taking as an example the unit jobs for discharging the solution into the microtubes 6.

Figure 15:
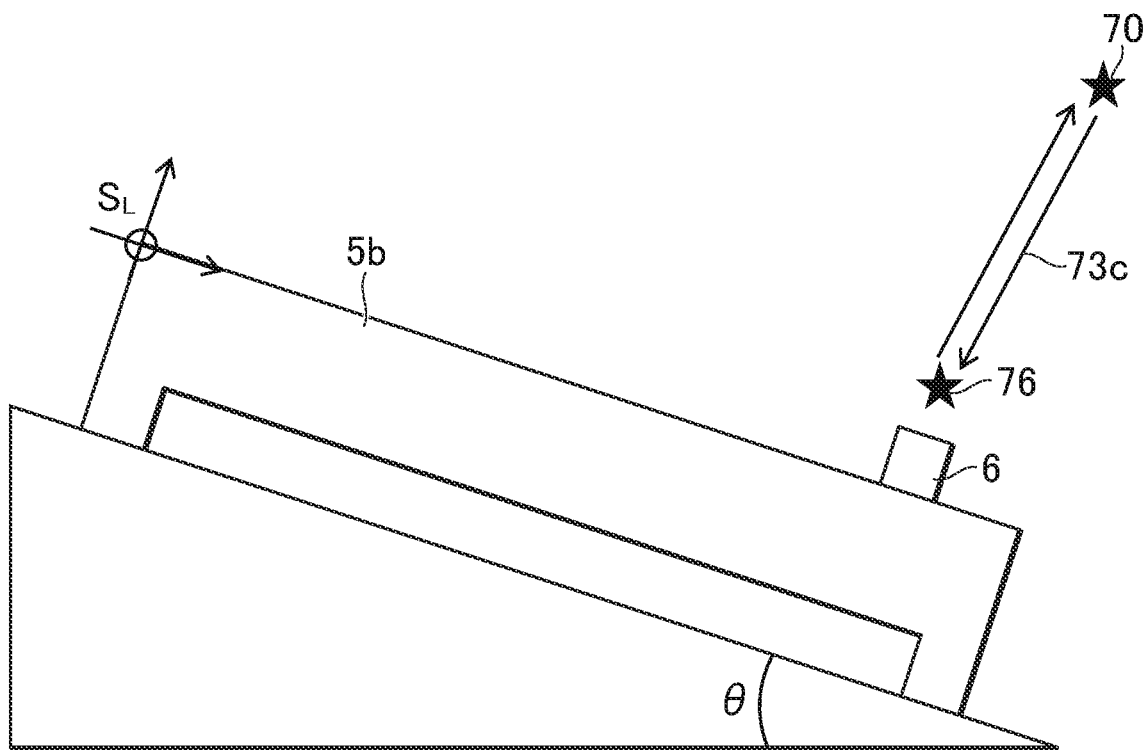
FIG. 15 is a diagram for illustrating a local coordinate system relating to a main rack and a movement path of hands during a unit job for discharging a solution into a microtube.

FIG. 15 is a diagram for illustrating a local coordinate system $S_L$ relating to the main rack 5b and a movement path of the hands during a unit job for discharging the solution into the microtube 6. The main rack 5b is fixedly installed at a specific position on a work bench. However, due to errors during installation and individual differences in shape, for example, it is not always the case that the main rack 5b is installed at a correct position. In FIG. 15, as an example of such an error, there is illustrated for emphasis a case in which the main rack 5b is inclined at an angle θ with respect to the robot coordinate system $S_R$. In such a case, during the work for discharging the solution, not only does the position of the hands at the distal ends of the robot arms slightly change, but it is also required to incline the pipet 4 held in the hands at the angle θ and move the hands in an oblique manner.

It is not practical for this correction to be reflected in the movement command of the unit job based on the installation error of the main rack 5b. The reason for this is that the value of the error changes due to the re-installation of the main rack 5b, and hence it is required to correct the unit job stored in the unit job group storage unit 1cb each time there is such a change. Further, when such a correction is required, unit jobs cannot be generated until the main rack 5b is actually installed and the installation error is measured.

Therefore, a coordinate system specification unit 23d in this embodiment sets the local coordinate system $S_L$ accompanying the device, and includes in the unit job a coordinate system specification command specifying the local coordinate system $S_L$. The movement command in the unit job is a movement command specified by the local coordinate system $S_L$. Therefore, in FIG. 15, a reference point 70, which is the position of the main rack 5b, and a work point 76 at which the work is performed on the microtube 6, are illustrated in terms of the local coordinate system $S_L$.

The origin and the direction of the local coordinate system $S_L$ are set such that the main rack 5b is at a position that is easy to measure. For example, as illustrated in FIG. 15, a corner of the main rack 5b is set as the origin, and the direction of a side of the main rack 5b is set as the coordinate axis. Setting in this manner, the movement command included in the unit job may be specified as a relative position with respect to the main rack 5b, which is a work device, and does not depend on the installation error of the main rack 5b.

When operating the robot 3, the robot control device 2 can easily operate the robot 3 by converting the coordinates of the local coordinate system $S_L$ into those of the robot coordinate system $S_R$ by measuring in advance a positional relation, including an error, between the robot coordinate system $S_R$ and the local coordinate system $S_L$. Specifically, when the operation of discharging the solution to the main rack 5b is written by using the local coordinate system $S_L$, the operation of the robot 3 becomes an operation in which, based on the reference point 70 shifted from the position in the robot coordinate system $S_R$ as the start position, the pipet 4 is held while being inclined at the angle θ, the solution is discharged at the work point 76 by the pipet 4 moving along a movement path 73c inclined at the angle θ, and the pipet 4 is returned to the reference point 70 along the movement path 73c that is still inclined at the angle θ.

In this way, when a unit job is written based on the local coordinate system $S_L$ determined for each work device handled by the unit job, the unit job can be generated without considering the installation error of the work device, and thus the productivity and maintainability of the unit job improve. It is sufficient for the installation error of the work device to be corrected during installation. It is not required to rewrite the robot operation command itself by recalculating the coordinates as a result of the correction, and hence power savings can be achieved.

Each of the configurations in the embodiment above is described as a specific example, and the invention disclosed in the present application is not intended to be limited to those specific configurations themselves. Various modifications may be made by a person skilled in the art to the disclosed embodiment. For example, the functions, the operation method, and the like may be appropriately changed and added. Further, the control illustrated in the flowcharts may also be appropriately replaced by one having equivalent functions. It should be understood that the technical scope of the invention disclosed in the present application cover all such modifications.

The invention claimed is:

1. A method of generating a robot operation command, the method comprising:
   extracting, with at least one processor operating with a memory device in a computer, a work command from an overall work flow;
   extracting, from a command definition database, a command definition corresponding to the extracted work command with the at least one processor operating with the memory device in the computer;
   generating, by referring to the read work command, a set of unit jobs which are arranged in order, based on the extracted command definition with the at least one processor operating with the memory device in the computer;
   generating a connecting job for causing a robot to be moved from an end position of a previous unit job of two consecutive unit jobs in the set of unit jobs to a start position of a subsequent unit job of the two consecutive unit jobs with the at least one processor operating with the memory device in the computer;

generating, with the at least one processor operating with the memory device in the computer, a robot operation command in which the previous unit job, the connecting job and the subsequent unit job are continuous;

generating, with the at least one processor operating with the memory device in the computer, state information representing at least states of a work device and the robot at a start time point and an end time point of the work command, the state information including at least one of whether or not a lid of a microtube is open, what is contained in the microtubes and an amount thereof, where the microtube is stored in a rack or whether the microtube is stored or not in a given position of the rack, and what equipment is held, or not held, in a hand of the robot;

storing, with the at least one processor operating with the memory device in the computer, the generated connecting job; and using, with the at least one processor operating with the memory device in the computer, a stored already generated connecting job when, for consecutive work commands, state information at an end time point of a previous work command and at a start time point of a next work command is the same as state information for the stored already generated connecting job; and controlling a robot based on the robot operation command.

2. The method of generating a robot operation command according to claim 1, wherein the generating a robot operation command includes retrieving unit jobs from a plurality of predetermined unit jobs stored in advance.

3. The method of generating a robot operation command according to claim 1,
wherein the command definition defines at least one order and combination of unit jobs to be used for each work command, and
wherein the at least one order and combination of unit jobs to be used for each work command are selected in accordance with a work condition of each work command.

4. The method of generating a robot operation command according to claim 3,
wherein the command definition includes, in addition to information representing the unit jobs to be used for each work command wherein the unit jobs have been arranged in order for execution, a conditional branch, and
wherein the generating a set of unit jobs includes converting the work command into the set of unit jobs arranged in series.

5. The method of generating a robot operation command according to claim 1, wherein the generating a connecting job includes referring to a work model to generate the connecting job for moving along a path in which interference between work models is inhibited from occurring.

6. The method of generating a robot operation command according to claim 5,
wherein the command definition includes robot held-object information, and
wherein the generating a connecting job includes generating the connecting job based on the robot held-object information.

7. The method of generating a robot operation command according to claim 1, further comprising calculating, with the at least one processor operating with the memory device in the computer, an overall work time, which is a time required to execute the overall work flow, by adding up a time, which is stored in advance and required to execute the set of unit jobs, and a time required to execute the connecting job.

8. The method of generating a robot operation command according to claim 7, wherein calculating an overall work time includes:
calculating the time required to execute the connecting job by simulating operation of the generated connecting job; and
calculating the overall work time, which is the time required to execute the overall work flow, by adding up the time, which is stored in advance and required to execute the set of unit jobs, and the calculated time required to execute the connecting job.

9. The method of generating a robot operation command according to claim 7, further comprising storing, with the at least one processor operating with the memory device in the computer, the time required to execute the generated connecting job.

10. The method of generating a robot operation command according to claim 1, further comprising generating, with the at least one processor operating with the memory device in the computer, state information representing states of a work device and the robot at a start time point and an end time point of a unit job in the set of unit jobs.

11. The method of generating a robot operation command according to claim 5, further comprising generating, with the at least one processor operating with the memory device in the computer, state information representing at least states of a work device and the robot at a start time point and an end time point of the work command, and
wherein the generating a connecting job includes generating, based on the state information, the connecting job for moving along a path in which interference between work models is inhibited from occurring.

12. The method of generating a robot operation command according to claim 1, further comprising skipping generation of the connecting job or discarding the generated connecting job when, for consecutive work commands, an end position of a previous work command and a start position of a next work command are the same with the at least one processor operating with the memory device in the computer.

13. The method of generating a robot operation command according to claim 1, further comprising discarding, when, for two consecutive unit jobs, a previous unit job and a subsequent unit job of the two consecutive unit jobs are the same and only a work position has been offset, a movement command to an end position included in the previous unit job and a movement command to a start position included in the subsequent unit job with the at least one processor operating with the memory device in the computer.

14. The method of generating a robot operation command according to claim 1, wherein a unit job of the set of unit jobs includes a coordinate system specification command for specifying a local coordinate system and a movement command that is based on the local coordinate system.

15. A robot operation command generation device, comprising a special purpose computer, which includes a central processing unit and a memory, programmed to:
extract a work command from an overall work flow;

extract, from a command definition database, a command definition corresponding to the extracted work command;

generate, by referring to the read work command, a set of unit jobs which are arranged in a defined order, based on the extracted command definition;

generate a connecting job for causing a robot to be moved from an end position of a previous unit job of two consecutive unit jobs in the set of unit jobs to a start position of a subsequent unit job of the two consecutive unit jobs;

generate a robot operation command in which the previous unit job, the connecting job and the subsequent unit job are continuous;

generate, with the at least one processor operating with the memory device in the computer, state information representing at least states of a work device and the robot at a start time point and an end time point of the work command, the state information including at least one of whether or not a lid of a microtube is open, what is contained in the microtubes and an amount thereof, where the microtube is stored in a rack or whether the microtube is stored or not in a given position of the rack, and what equipment is held, or not held, in a hand of the robot;

store, with the at least one processor operating with the memory device in the computer, the generated connecting job; and use, with the at least one processor operating with the memory device in the computer, a stored already generated connecting job when, for consecutive work commands, state information at an end time point of a previous work command and at a start time point of a next work command is the same as state information for the stored already generated connecting job; and control a robot based on the robot operation command.

16. The robot operation command generation device according to claim 15, further programmed to store a plurality of unit jobs generated in advance, and refer to the plurality of stored unit jobs when generating the robot operation command.

* * * * *